(12) United States Patent
Dietenberger et al.

(10) Patent No.: US 8,529,644 B2
(45) Date of Patent: Sep. 10, 2013

(54) METHOD AND APPARATUS TO PRODUCE SYNTHESIS GAS VIA FLASH PYROLYSIS AND GASIFICATION IN A MOLTEN LIQUID

(75) Inventors: Mark A. Dietenberger, Marshall, WI (US); Mark H. Anderson, Madison, WI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 280 days.

(21) Appl. No.: 12/964,036

(22) Filed: Dec. 9, 2010

(65) Prior Publication Data
US 2011/0088320 A1    Apr. 21, 2011

Related U.S. Application Data

(62) Division of application No. 12/108,747, filed on Apr. 24, 2008, now Pat. No. 7,875,090.

(60) Provisional application No. 60/913,681, filed on Apr. 24, 2007.

(51) Int. Cl.
*B01J 7/00* (2006.01)
*C10J 3/00* (2006.01)
*C01B 6/24* (2006.01)
*C01B 3/02* (2006.01)
*C01B 3/24* (2006.01)

(52) U.S. Cl.
USPC ............. 48/61; 48/210; 48/111; 423/644; 423/648.1; 423/650; 423/210.5

(58) Field of Classification Search
USPC ............. 48/61, 210; 423/644, 648.1, 111
See application file for complete search history.

(56) References Cited

U.S. PATENT DOCUMENTS 3,647,379 A    3/1972   Wenzel et al.
4,126,668 A    11/1978  Erickson
(Continued)

OTHER PUBLICATIONS

Agrawal, Singh, Riberio & Delgass, (Mar. 14, 2007) "Sustainable Fuels for the Transportation Sector," Proceedings of the National Academy of Sciences, doi:10.1073/pnas.0609921104.

(Continued)

*Primary Examiner* — Matthew Merkling
(74) *Attorney, Agent, or Firm* — Joseph T. Leone, Esq.; DeWitt Ross & Stevens S.C.

(57) ABSTRACT

Disclosed are a method and a corresponding apparatus for converting a biomass reactant into synthesis gas. The method includes the steps of (1) heating biomass in a first molten liquid bath at a first temperature, wherein the first temperature is at least about 100° C., but less than the decomposition temperature of the biomass, wherein gas comprising water is evaporated and air is pressed from the biomass, thereby yielding dried biomass with minimal air content. (2) Recapturing the moisture evaporated from the biomass in step 1 for use in the process gas. (3) Heating the dried biomass in a second molten liquid bath at a second temperature, wherein the second temperature is sufficiently high to cause flash pyrolysis of the dried biomass, thereby yielding product gases, tar, and char. (4) Inserting recaptured steam into the process gas, which may optionally include external natural gas or hydrogen gas or recycled syngas for mixing and reforming with tar and non-condensable gases. (5) Further reacting the product gases, tar, and char with the process gas within a third molten liquid bath at a third temperature which is equal to or greater than the second temperature within the second molten liquid bath, thereby yielding high quality and relatively clean synthesis gas after a relatively long residence time needed for char gasification. A portion of the synthesis gas so formed is combusted to heat the first, second, and third molten liquid baths, unless external natural or hydrogen gas is available for this use.

2 Claims, 12 Drawing Sheets

(56) References Cited

U.S. PATENT DOCUMENTS

| | | | |
|---|---|---|---|
| 4,344,773 | A | 8/1982 | Paschen et al. |
| 4,345,990 | A | 8/1982 | Fahlstrom et al. |
| 4,649,867 | A | 3/1987 | Cordier et al. |
| 4,925,532 | A | 5/1990 | Meuser et al. |
| 5,085,738 | A | 2/1992 | Harris et al. |
| 5,478,370 | A | 12/1995 | Spangler |
| 5,693,188 | A | 12/1997 | Donnohue et al. |
| 5,728,271 | A | 3/1998 | Piskorz et al. |
| 6,051,110 | A | 4/2000 | Dell 'Orfano et al. |
| 6,110,239 | A | 8/2000 | Malone et al. |
| 6,663,681 | B2 | 12/2003 | Kindig et al. |
| 6,830,597 | B1 | 12/2004 | Green |
| 6,863,878 | B2 | 3/2005 | Klepper et al. |
| 2005/0032920 | A1 | 2/2005 | Norbeck et al. |

OTHER PUBLICATIONS

Anderson et al. (2005), "Liquid-Metal/Water Direct Contact Heat Exchange: Flow Visualization, Flow Stability, and Heat Transfer Using Real-Time X-Ray Imaging," Nuclear Science and Engineering, 150:182-220.

Dietenberger (2002), "Update for Combustion Properties on Wood Components," Fire and Materials Journal, 26:255-267.

Henrich & Dinjus (2002), "Tar-free, high pressure synthesis gas from biomass," Expert Meeting on Pyrolysis and Gasification of Biomass, Strasbourg, France Sep. 30-Oct. 1.

Fushimi et al. (2003), Effect of Heating Rate on Steam Gasification of Biomass. 2. Thermogravimetric-Mass Spectrometric (TG-MS) Analysis of Gas Evolution, *Ind. Eng. Chem. Res.*, 42:3929-3936.

Perlack, Wright, Turhollow, Graham, Stokes, and Erbach, "Biomass as Feedstock for a Bioenergy and Bioproducts Industry: The Technical Feasibility of a Billion-Ton Annual Supply," Apr. 2005, available at http://feedstockreview.ornl.gov/pdf/billion_ton_vision.pdf.

METHOD AND APPARATUS TO PRODUCE SYNTHESIS GAS VIA FLASH PYROLYSIS AND GASIFICATION IN A MOLTEN LIQUID

CROSS-REFERENCE TO RELATED APPLICATIONS

This is a divisional of application Ser. No. 12/108,747, filed Apr. 24, 2008 now U.S. Pat. No. 7,875,090, which claims priority to provisional application Ser. No. 60/913,681, filed Apr. 24, 2007, both of which are incorporated herein by reference.

FEDERAL FUNDING STATEMENT

This invention was made with United States government support awarded by the following agency: USDA/FS 06-JV11111136-104. The United States has certain rights in this invention.

FIELD OF THE INVENTION

The invention is directed to a method and corresponding apparatus to produce synthesis gas from solid biomass by pyrolyzing and gasifying the biomass in a pool of liquid metal.

BACKGROUND

Since the early 1900's, efforts have been made to develop an efficient means to convert solid, carbon-containing reactants into liquid fuels. The early work in the field was performed in Germany in the years prior to and between the two world wars. In 1912-13, Frederick Bergius described the fundamental process for hydrogenating coal under very high pressure to yield liquid fuels. (Bergius was awarded a one-half share of the 1931 Nobel Prize in chemistry for this work. Carl Bosch, a titan of the German chemical field, was awarded the other half.) Bergius' "direct liquefaction" of coal was used to produce liquid fuels in Germany during both world wars. A decade after Bergius' work, Franz Fischer and Hans Tropsch, while at the Kaiser Wilhelm Institute, developed the chemistry that now bears their names, and is sometimes referred to as "indirect liquefaction." The general Fischer-Tropsch synthesis is a metal-catalyzed reaction to produce liquid hydrocarbons from a feedstock comprising hydrogen and carbon monoxide. The feedstock is universally referred to as synthesis gas, or simply "syngas." The syngas itself is derived from the partial combustion of methane or from the gasification of coal or other biomass. The general reactions are as follows:

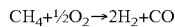

$CH_4 + \frac{1}{2}O_2 \rightarrow 2H_2 + CO$

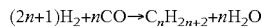

$(2n+1)H_2 + nCO \rightarrow C_nH_{2n+2} + nH_2O$

The worldwide depression of the 1930's placed a severe economic strain on German companies' early efforts to build large-scale coal gasification plants. As the depression lingered on, crude oil prices plunged to 10 cents per barrel, resulting in a worldwide glut of cheap oil. Two developments, however, stemmed the collapse of the nascent goal gasification industry: (1) the rise of the Nazi government; and (2) the consolidation of the entire German chemical enterprise into an enormous, centrally-organized cartel (I.G. Farben). Begun in 1925, the formation and growth of I. G. Farben and its influence on the development of coal gasification technology can hardly be understated. Underwritten by the Nazi government, and backed by the full might of Germany's preeminent chemical and industrial prowess, German efforts to convert its coal riches into liquid fuel continued unabated throughout the 1930's.

These efforts were vastly expanded during the years of World War II (1939-1945), as Germany was increasingly denied access to sources of crude oil. Synthetic liquid fuels produced from coal gasification accounted for roughly half of Germany's total production of fuel near the end of the war—124,000 barrels per day from 25 plants at its peak near the end of 1944. At that point, synthetic fuel accounted for 92% of Germany's aviation gasoline. (Intense allied bombing of German synthetic fuel plants began in earnest in late 1944 and early 1945. The results were immediate and fatal for the German war machine. In February 1945, Nazi Germany produced roughly a thousand tons of synthetic aviation gasoline—about one half of one percent of the level of the first four months of 1944. Hostilities in Europe ceased in May of 1945.) See U.S. Department of Energy, "The Early Days of Coal Research."

After World War II, efforts to gasify coal and biomass stagnated as huge reserves of crude oil were discovered and exploited in the Middle East, Venezuela, Nigeria, and elsewhere. The formation of another cartel, the Organization of Petroleum Exporting Countries (OPEC), and its exercise of pricing power in crude oil markets rejuvenated the coal and biomass gasification field. Founded in 1960 by Iran, Iraq, Kuwait, Saudi Arabia and Venezuela (and later joined by Qatar, Indonesia, Libya, UAE, Algeria, Nigeria and Angola), OPEC did not rise to prominence until 1973, when the Arab members of OPEC instituted an oil embargo that sent crude oil prices skyrocketing. The Islamic fundamentalist revolution in Iran in 1979 sent crude oil prices briefly into the stratosphere ($100 per barrel when adjusted for inflation to January 2007). The mid-1980's, however, saw an equally dramatic drop in oil prices from their 1979 highs. Continued political instability in the middle east starting with the 1991 Gulf War, and extending to the panic caused by the Sep. 11, 2001 terrorist attacks in the U.S. (and the subsequent U.S. invasion and occupation of Iraq), coupled with the rapid industrialization of China and India, have combined to maintain current crude oil prices at very high levels.

From a technological standpoint, developments in coal and biomass gasification have proceeded along many fronts. For example, U.S. Pat. No. 2,459,550, issued Jan. 18, 1949, to A. J. Stamm, describes an apparatus for continuous destructive distillation of solids (principally wood in the form of sawdust or chips, and coal in the form of coal dust or pea-sized particles) in a bath of molten metal. The material to be gasified is carried between two finely porous, continuously looped screens that pass beneath the surface of a pool of liquid metal. The heat from the liquid metal is rapidly transferred to the material. Volatile compounds within the material are thereby vaporized, and the vapors pass through the porous screen, rise through the molten metal, and are then condensed. Both the resulting condensate and the charred solid material are then recovered. Similar, single-bath devices are described in U.S. Pat. Nos. 4,649,867; 4,925,532; and 5,693,188.

U.S. Pat. No. 3,647,379, issued Mar. 7, 1972, to Wenzel et al. describes a device for gasifying a coal/water mixture. The device is a single-chamber device in which dehydration of the coal is followed by gasification of the dried coal and then endothermic reaction of the resulting gas products.

U.S. Pat. No. 4,126,668, issued Nov. 21, 1978, to Erickson, describes a method to produce a hydrogen-rich gas such as pure hydrogen, ammonia synthesis gas, or methanol synthesis gas by reacting steam with a non-gaseous intermediate, whereby some of the steam is reduced to hydrogen and some of the intermediate is oxidized. Carbon dioxide may be added to (or substituted for) the steam, whereby carbon monoxide is produced in addition to (or in lieu of) $H_2$. The oxidized intermediate is reduced by a reducing gas. The reducing gas is generated by partially reforming a light hydrocarbon such as natural gas or naphtha with steam and/or $CO_2$, and then partially oxidizing the partially reformed gas with air. The low BTU exhaust gas resulting after reduction of the intermediate oxide is used as fuel for the primary reformer. When ammonia synthesis gas is produced by this process, the purge and flash gases from the ammonia synthesis loop are added to the reducing gas.

U.S. Pat. No. 4,344,773, issued Aug. 17, 1982, to Paschen et al. describes an apparatus for gasifying carbon-containing media. The device includes a molten iron both for gasifying the reactants and a plurality of nozzles for introducing the reactants into the molten iron bath. An outlet is also provided for removing slag from the bath. Because it uses molten iron, this device has distinct drawbacks. Melting the iron requires an extremely high reactor temperature. This, in turn, spawns other considerations. For example, the high temperature of the molten iron is extremely detrimental to the reactor lining. To ensure long lining life requires essentially zero motion of the iron melt.

Likewise, the liquid slag is very difficult to handle due to the extreme temperatures involved. The process also is not energy efficient because it is hard to obtain a quality syngas at such high temperatures.

U.S. Pat. No. 4,345,990, issued Aug. 24, 1982, describes a continuous method for recovering oil and gas from carbon-containing material. The apparatus described here uses two molten-metal baths. No screens are utilized. Instead, the material to be gasified is placed directly into the bath. The first bath is a comparatively low-temperature bath maintained at about 500° C., while the second bath is maintained at a much higher temperature of about 1,200° C. Two different metals, substantially insoluble in each other when melted, are used in the two baths. Lead is the preferred metal for the first bath; iron is the preferred metal for the second bath. The reactant material is deposited into the first bath (molten lead), and the volatized gases are collected. The molten lead, with the partially distilled carbonaceous material within it, is then transferred to the second bath (molten iron). Here, oxygen is injected into the gas space above the molten iron. The carbonaceous material moves from the lead phase, to the iron phase, where it is further volatilized. The volatile gases liberated from the solids react with the oxygen in the headspace above the molten iron. The molten lead (which is not soluble in the molten iron) settles to the bottom of the second bath and is transferred back to the first vessel. Of particular note in this method is that the thermal decomposition in the first bath takes place in the absence of added oxygen, while oxygen is purposefully added in the second thermal decomposition. By recycling the lead that settles to the bottom of the second bath back into the first bath, the heat required to melt the iron is backward integrated to heat the lead too. In the second bath, the remaining amount of carbon in the solid reactant is gasified to syngas by adding a balanced amount of oxygen to the reaction (in the form of oxygen gas, air, oxides, etc.). Any remaining solids are removed as slag. The principal drawback of this device is that it requires pumping molten metals from bath-to-bath. Thus, the device has numerous mechanical parts that operate at extremely high temperatures.

U.S. Pat. No. 5,085,738, issued Feb. 4, 1992, to Harris et al. describes an apparatus for gasifying organic waste materials. The apparatus includes an elongated and inclined chamber filled with molten lead. Organic material introduced in a lower portion of the chamber migrates through the molten lead to a higher portion of the chamber due to the organic material having a specific gravity less than the molten lead. As the organic material migrates through the molten lead, the material is gasified. The resulting vapor-phase hydrocarbons are then captured in a condenser. The gaseous hydrocarbons are utilized to heat the lead in the chamber and the vapor is condensed to liquid hydrocarbons in the condenser. Residual solids flow to a reservoir connected to the chamber. This apparatus described here is intended for processing tire scraps and generally operates in the temperature range of 340° C. to 510° C. Other waste material can be used (such as wood and paper products). However, the pyrolysis products of woody biomass will have high amounts of heavy tar and char at this temperature range. The char would be difficult to manage in this single-chamber reactor apparatus. See also Published U.S. Patent Application 2005/0 131 260.

U.S. Pat. No. 5,478,370, issued Dec. 26, 1995, to Spangler describes a method for producing syngas from lower alkanes. In this approach, a molten metal oxide bath delivers oxygen to a feed stream containing lower alkanes. A reaction thus takes places wherein the lower alkanes are oxidized to produce carbon dioxide and the molten metal oxide is reduced to the elemental metal. The elemental metal is regenerated to the metal oxide by contact with a regenerant such as air. Heat from the molten baths is transferred to an endothermic reactor where a portion of the carbon dioxide-containing gas is converted to a mixture of carbon oxides and hydrogen.

U.S. Pat. No. 6,051,110, issued Apr. 18, 2000, to Dell'Orfano et al. describes a partially integrated, continuous process (and corresponding apparatus) to distill carbonaceous materials. In a fashion similar to the looped screens of the Stamm patent (see above), the Dell'Orfano patent uses mesh baskets to convey the carbonaceous material through the process. Using the baskets also eases recovery of the solid products that remain after gasification. In this approach, the carbon-containing reactants (preferably wood) are passed first through a de-gassing bath containing heated liquefied volatiles recovered from earlier runs (and referred to as "wood petrol" in the patent). The first bath degasses the wood without degrading the released gases. The de-gassed wood is then passed through a molten-metal bath (preferably molten lead), which converts the wood to char and volatiles. The volatiles are collected and a portion of them are recycled for use as the "wood petrol" in the first degassing bath. The remaining gases are collected. Lastly, the char is then passed through a condensing bath. Oxygen is specifically excluded from the second and third baths.

U.S. Pat. No. 6,110,239, issued Aug. 29, 2000, to Malone et al. describes a two-zone process in which a high-pressure hydrogen-rich gas stream and a high-pressure carbon monoxide-rich gas stream are simultaneously produced in separate zones using a molten-metal gasifier. Because the two gas streams are produced in separate zones, this approach eliminates the need to separate or compress the two gases. The process as described includes introducing a hydrocarbon feed into a molten metal bath beneath the molten metal surface in a first feed zone operating at a pressure above five (5) atmospheres absolute, which decomposing the hydrocarbon feed into a hydrogen-rich gas, and carbon. The carbon dissolves in the molten metal. The carbon concentration in the molten metal is carefully maintained to remain at or below the limit of solubility of carbon in the molten metal. A portion of the molten metal is then transferred from the feed zone to another molten metal oxidation zone operating at a pressure above five (5) atmospheres absolute into which an oxygen-containing material is introduced. The carbon dissolved in the metal reacts with the introduced oxygen to form a carbon monoxide-rich gas which leaves the oxidation zone. Thus, the carbon concentration in the molten metal is reduced. In this zone, the carbon concentration in the molten metal is controlled so that it does not reach the concentration at which the equilibrium oxygen concentration would exceed its solubility limit in the molten metal (in which instance a separate iron oxide phase would accumulate). A portion of the molten metal which has a lower carbon concentration from the oxidation zone is then recycled back to the feed zone. The two gas streams are passed out of their respective zones. The main disadvantage of this approach is that the concentration of carbon and oxygen in the two zones must be very carefully controlled, or CO will contaminate the $H_2$ gas stream. If the oxygen exceeds its solubility limit in the second zone of the molten metal, the oxygen will also react with the hydrocarbon in the first zone to create a CO impurity in the hydrogen-rich gases.

U.S. Pat. No. 6,663,681, issued Dec. 16, 2003, to Kindig et al. describes a method for producing hydrogen gas. The hydrogen gas is formed by reducing steam using a metal/metal oxide bath (e.g. iron/iron oxide) to remove oxygen from water. The steam is contacted with a molten metal mixture including a first reactive metal (iron) dissolved in a diluent metal (tin). The reactive metal oxidizes to the corresponding metal oxide, forming a hydrogen gas (via reduction). The metal oxide can then be reduced back to the metal for further production of hydrogen without substantial movement of the metal or metal oxide to a second reactor.

U.S. Pat. No. 6,830,597, issued Dec. 14, 2004, to Green, describes a process and device for gasifying biomass. In this approach, heat from a combustion chamber is used to gasify or liquefy biomass. The combustion chamber partially surrounds a reactor tube and is in direct thermal contact with the reactor tube. In this fashion, heat from the combustion chamber passes directly through the reactor wall to heat the biomass within the reactor tube.

U.S. Pat. No. 6,863,878, issued Mar. 8, 2005, to Klepper et al., describes a method of producing syngas from biomass or other carbonaceous material. The method utilizes a controlled devolatilization reaction in which the temperature of the feed material is maintained at less than 232° C. (450° F.) until most of the available oxygen is consumed. The reaction is carried out at this very low temperature to minimize pyrolysis of the feed material. The method backward integrates the resulting syngas to provide the energy for the initial gasification reaction. The approach does required using high-pressure, high-temperature (1,000° C.) high-pressured steam to gasify the low-temperature biomass residues. This process is inefficient with respect to converting the carbon in the biomass reactant into syngas. The residual air combusts with the feedstock. The resulting energy is used to heat the biomass to the required temperature. That carbon is lost out the flue and is not converted to syngas.

Published U.S. Patent Application 2005/0 032 920, published Feb. 10, 2005, to Norbeck et al., describes a multi-step, integrated, steam pyrolysis apparatus for producing syngas for use as a gaseous fuel or as a feedstock for Fischer-Tropsch reactions. The process is described as "substantially self-sustaining." Here, slurry of particles of carbonaceous material in water, and hydrogen, is fed into a hydro-gasification reactor under conditions that yield a methane-containing product gas. This methane-containing gas is then fed into a steam pyrolytic reformer to yield syngas. A portion of the hydrogen generated by the steam pyrolytic reformer is fed through a hydrogen purification filter and backward integrated into the hydro-gasification reactor used in the first step. The remaining synthesis gas generated by the steam pyrolytic reformer can be used directly as a fuel. Alternatively, the syngas may be fed into a Fischer-Tropsch reactor to produce liquid fuels. Molten salt loops are used to transfer heat from the hydro-gasification reactor (and the Fischer-Tropsch reactor if a liquid fuel is produced), to the steam generator and the steam pyrolytic reformer.

Very recently, a paper appeared in the Proceedings of the National Academy of Sciences, Agrawal, Singh, Ribeiro & Delgass (Mar. 14, 2007) "Sustainable Fuels for the Transportation Sector," PNAS, doi:10.1073/pnas.0609921104. This paper presents a much generalized scheme for producing liquid fuels by producing hydrogen ($H_2$) from carbon-free primary energy source, e.g., solar, nuclear, wind. The hydrogen so produces is then reacted with gasified solids, such as coal or biomass. The overall goal is the complete incorporation of every carbon atom present in the reactant into a molecule of liquid fuel product. Carbon dioxide produced in the biomass gasification step is constantly recycled into the reactor, thus eliminating the release of carbon dioxide into the atmosphere. It must be noted, however, that the paper sets forth only a conceptual framework. As the authors themselves state, the chemical processing systems to accomplish the process "are yet to be defined."

Thus there remains a long-felt and unmet need to produce liquid fuels efficiently from biomass and other solid reactants.

SUMMARY

The gasifier apparatus described and claimed herein uniquely utilizes a molten liquid (e.g., a molten metal or ionic liquid) as a heat, mass, and reaction carrier to advance the biomass biorefinery via thermo-chemical processes. Because liquid metals and salts have very high heat transfer rates and a wide range of operating temperatures, using them as energy carriers in a biomass gasifier provides significant advantages in reducing the system complexity, size, and costs. Described herein are two versions of a continuous gasifier for converting biomass into syngas. The syngas can then be used in any fashion, but is preferably integrated to a reactor using the well-understood Fischer-Tropsch synthesis to convert the syngas to a liquid synfuel, such as a fuel comprising alcohols and/or alkanes. The gasifier described herein is designed to convert all or substantially all of the carbon in the biomass feedstock into raw, high-BTU, and clean syngas.

This end is achieved by introducing multiple functionalities into the gasifier. Specifically, in the preferred versions, wet biomass is introduced into naturally-pressured molten liquid slurry. (The molten liquid can be a molten metal or a molten ionic liquid. Unless otherwise noted, the term "salt" as used herein is synonymous with "molten ionic liquid.") Alternatively, the apparatus incorporates a biomass drier that efficiently pre-dries wet biomass at temperatures below degradation (<200° C.). The apparatus functions to cause effective pyrolyzing and cracking of tar in the hot (<1,000° C.) slurry zone. The resulting pressurized gas bubbles are reformed with backward integrated steam into syngas. Contaminates such as sulfur and other elements are retained by the molten liquid, where they can be removed by filtration. These and other sub-processes that interact with the molten liquid are detailed in full herein.

The present apparatus yields liquid fuels at levels near the theoretical maximum for a gasifier. That is, the current technology has a high synfuel output from woody biomass that can be further increased by 60% or more on a self-sufficient energy basis, or by 100% or more if external heat sources such as solar energy or combusting natural gas are used in the gasifier. The synfuel yield of the device can be greatly increased (by 191% or more) if external hydrogen gas sources are also used as feedstock to the gasifier (see also Tables 1 and 2).

The gasifiers are adaptable to these various levels of fuel output, with the expense and scale of the apparatus rising with the productivity level. The specific sub-processes and the economics associated with overall efficiency of the device will ultimately define the production cost-per-gallon of the synfuel.

The present method and corresponding apparatus involves preparing the biomass residue for the gasification/reformer stage in a manner that allows all carbon in the feedstock to reach the syngas. This preparatory process comprises two stages: A first, low-temperature drying stage to drive moisture and the non-combustible gases from the biomass reactant. (The water is recycled for steam injection in the pyrolysis/gasification and/or gasification/reformer stages.) The second stage starts with a fast pyrolysis step at a much higher temperature (generally 300° C. to 1,200° C.). The heat for both stages is provided by one or more molten liquid baths that are thermostatically maintained at the desired temperatures. Tar and non-condensing gases from the pyrolysis are mixed with the process gas from the first stage and/or backward integrated syngas and/or a natural gas feedstock (the mix comprises steam, $H_2$, $CO_x$, or $CH_4$ but not $N_2$ or $O_2$). These gases are then reformed, and the developing char gasified, at high pressures and temperatures within the bubbles that form in the fast-pyrolysis bath (and in the headspace above the pyrolysis chamber). This fast pyrolysis and partial gasification/reforming may take place in the absence of catalysts, or in the presence of metallic catalysts to aid in driving the gasification and reforming reactions to completion. Some examples of reactive metallic catalysts include, without limitation: Ge, Fe, Zn, W, Mo, In, Sn, Co, Pb, and Sb. These metals form metal oxides by taking oxygen from steam and releasing $H_2$. The released hydrogen exothermically gasifies the char and hydrogenates the heavy tar. The metal oxide formed circulates with the diluent metal to the gasification/reformer stage to provide oxygen to react with the entering light hydrocarbons and any remaining char to form more $H_2$ and CO for syngas. The availability of nuclear- or solar-derived $H_2$ gas for mixing in with the process gas could also eliminate the use of reactive metallic catalysts.

A portion of the resulting syngas can then be backward integrated to fire the burner(s) for the drying chamber and the fast-pyrolysis chamber. This use of backward integrated syngas can also be avoided partially or fully with the availability of a natural gas source and/or the nuclear- or solar-derived $H_2$ gas to fire the burner(s). As noted in the Detailed Description, the biomass reactant can be indirectly contacted with the molten liquid using porous screens or porous tubes, in which case the molten baths are static. Alternatively, the biomass reactants may be directly contacted with the molten liquid and the molten liquid/biomass slurry moved from chamber to chamber.

The bench-scale tests described in the Examples show that the present invention yields a high quality syngas that can be obtained without the use of catalysts and through thermal means only. (Catalysts, as noted above, may also be used in the process, if desired. Any metal-containing catalyst now known or developed in the future for catalyzing reforming reactions may be used in the present invention.) That is, the process can operate in the absence of catalysts, preferably at temperatures less than about 1,000° C., and as low as about 950° C. (far below the melting point of iron and the melting point of slag consisting of biomass ash). Ceramic-lined steel tanks have been successfully used at temperatures below the melting point of iron (using lower temperature molten liquids such as lead) even when the metals are in motion to achieve heat and mass transfer of the feedstock. At temperatures of about 1,000° C. and lower, the non-reacting residues of biomass remain as solids, making them easier to remove (e.g., by skimming or using a cyclone separator).

A particular advantage of the present invention is that it can convert mixed biomass feedstocks into alkane fuels at high efficiency and without the need for an external water source. In the case of "generic" wood as an exemplary biomass reactant, the full conversion of wood to syngas requires an enthalpy increase of 603 kJ/mol. (The overall reaction is $C_6H_9O_4 + 2 H_2O \rightarrow 6CO + 6.5 H_2$. The combustion energy of the resulting syngas, however, is 3,250 kJ/mol. Thus, backward integrating only 19% of the resulting syngas to heat the various molten metal baths is all that is required to make the reactor self-sufficient. The remaining 81% of the product syngas can then be used in conventional fashion, e.g., for direct combustion in a generator, for Fischer-Tropsch synthesis, etc.

Moreover, because the apparatus is heavily insulated (to limit heat losses), once the apparatus is brought to operating temperatures, there is very little heat loss. Thus, roughly 1% of the syngas needs to be combusted to make up for molten liquid heat losses once the apparatus is up and running. Thus the present invention enables a one-pass, 80% efficient water-gas shift/Fischer-Tropsch reactor (with 20% of the resulting syngas being combusted to heat the gasifier). The conversion of the syngas to iso-octane involves an enthalpy release of −760 kJ/mol. Water is fully recovered and recycled into the process. At 80% efficiency then, the Fischer-Tropsch exothermic heat of 608 kJ/mol is sufficient to dry the incoming biomass reactants. The moisture is recycled for use in the gasification step. Electricity can be generated from a fuel cell operating at the same temperature as the gasification chamber. The electricity so generated can then be used to drive the auger, conveyers, and other ancillary equipment associated with the apparatus of the present invention. Thus, the device can be integrated into a self-powered mobile unit. Biomass is the reactant. The resulting products are syngas (and liquid fuels made from the syngas), electricity, $N_2$ and $CO_2$ exhaust gases, and excess water.

Thus, the invention is directed to a method and corresponding apparatus for making syngas from biomass. A first version of the apparatus comprises a first molten liquid bath dimensioned and configured to maintain a molten liquid at a first temperature suitable for drying a biomass reactant without degrading the biomass reactant. In this first bath, wet biomass is dried to yield dried biomass and process gas comprising water (and other gases). The first bath is operationally connected to, and dimensioned and configured to transfer molten liquid and dried biomass contained therein to a second molten liquid bath. The second bath is dimensioned and configured to maintain a molten liquid at a second temperature suitable for fast pyrolyzing the dried biomass to yield gas, tar, and char. The second bath is dimensioned and configured to transfer molten liquid, and the gas, tar, and char contained therein to a third molten liquid bath. This third bath is dimensioned and configured to maintain a molten liquid at a third temperature suitable for reforming the gas, tar, and char into synthesis gas. The third bath is dimensioned and configured to transfer molten liquid, tar, and char contained therein to a separator. The separator is dimensioned and configured to separate tar and char from the molten liquid to yield clean molten liquid. The separator is also operationally connected to the first molten liquid bath and is dimensioned and configured to transfer clean molten liquid back to the first molten liquid bath. Lastly, a conduit is operationally connects the first molten liquid bath to the third molten liquid bath. The conduit is dimensioned and configured to transfer process gas from the first molten liquid bath to the third molten liquid bath. Because water from the raw biomass is recycled into the third molten bath, an external source of water is not usually required (depending upon the initial moisture content of the biomass).

A second version of the apparatus comprises a first molten liquid bath dimensioned and configured to maintain a molten liquid at a first temperature suitable for drying a biomass reactant without degrading the biomass reactant, to yield process gas and dried biomass. A second molten liquid bath, dimensioned and configured to maintain a molten liquid at a second temperature, and suitable for fast pyrolyzing the dried biomass to yield gas, tar, and char, is also provided. A third molten liquid bath dimensioned and configured to maintain a molten liquid at a third temperature suitable for reforming gas, tar, and char into synthesis gas is also provided. A char crusher is interposed between the second molten liquid bath and the third molten liquid bath. The char crusher is dimensioned and configured to crush char into powdered char. A conveyer assembly is provided to move reactants between the various chambers. The conveyor is dimensioned and configured to: (a) move the dried biomass from the first molten liquid bath to the second molten liquid bath; (b) to move char from the second molten method bath to the char crusher; and (c) to move powdered char from the char crusher to the third molten liquid bath. As in the first version of the invention, a conduit is provided that operationally connects the first molten liquid bath to the third molten liquid bath. The conduit is dimensioned and configured to transfer process gas from the first molten liquid bath to the third molten liquid bath.

The inventive method is a method to convert a biomass reactant into synthesis gas. The method comprises heating biomass in a first molten liquid bath at a first temperature, wherein the first temperature is at least about 100° C., but less than the decomposition temperature of the biomass, wherein process gas comprising water and small amounts of residual air and volatile organic compounds (VOCs) is evaporated from the biomass, thereby yielding dried biomass. The process gas evaporated from the biomass is captured. The dried biomass is heated in a second molten liquid bath at a second temperature, wherein the second temperature is sufficiently high to cause flash pyrolysis of the dried biomass, thereby yielding product gases, tar, and char. Process gas can be added at this point to enhance char gasification immediately after the pyrolysis event. The product gases, tar, and char are then reacted further with the process gas within third molten liquid bath at a third temperature which is equal to or greater than the second temperature within the second molten liquid bath, thereby yielding synthesis gas. A portion of the resulting synthesis gas is combusted to heat the first, second, and third molten liquid baths (unless external natural gas or hydrogen gas is available to be combusted instead).

The portion of the synthesis gas used to heat the device itself can be combusted to heat the third molten liquid bath only. Heat from the third molten liquid bath is then integrated to heat the second and first molten liquid baths (whose temperatures are lower than the third bath). The biomass reactants can be directly immersed into the various liquid baths, or heated indirectly by placing the biomass reactants within a suitable porous container that allows gas to escape the container but prevents molten liquid from entering the container.

It is generally preferred that the temperature in the first bath is less than about 200° C., the temperature in the second bath is from about 300° C. to about 800° C., and the temperature in the third bath is less than about 1,200° C.

It is preferred that when metals are used, the molten metal in each of the first, second, and third baths is the same and comprises a metal selected from the group consisting of Ga, In, Pb, and alloys thereof. The metal may be further alloyed with a metal selected from the group consisting of Bi, Cd, Tl, Sn, and combinations thereof.

DETAILED DESCRIPTION OF THE INVENTION

Figure 1:
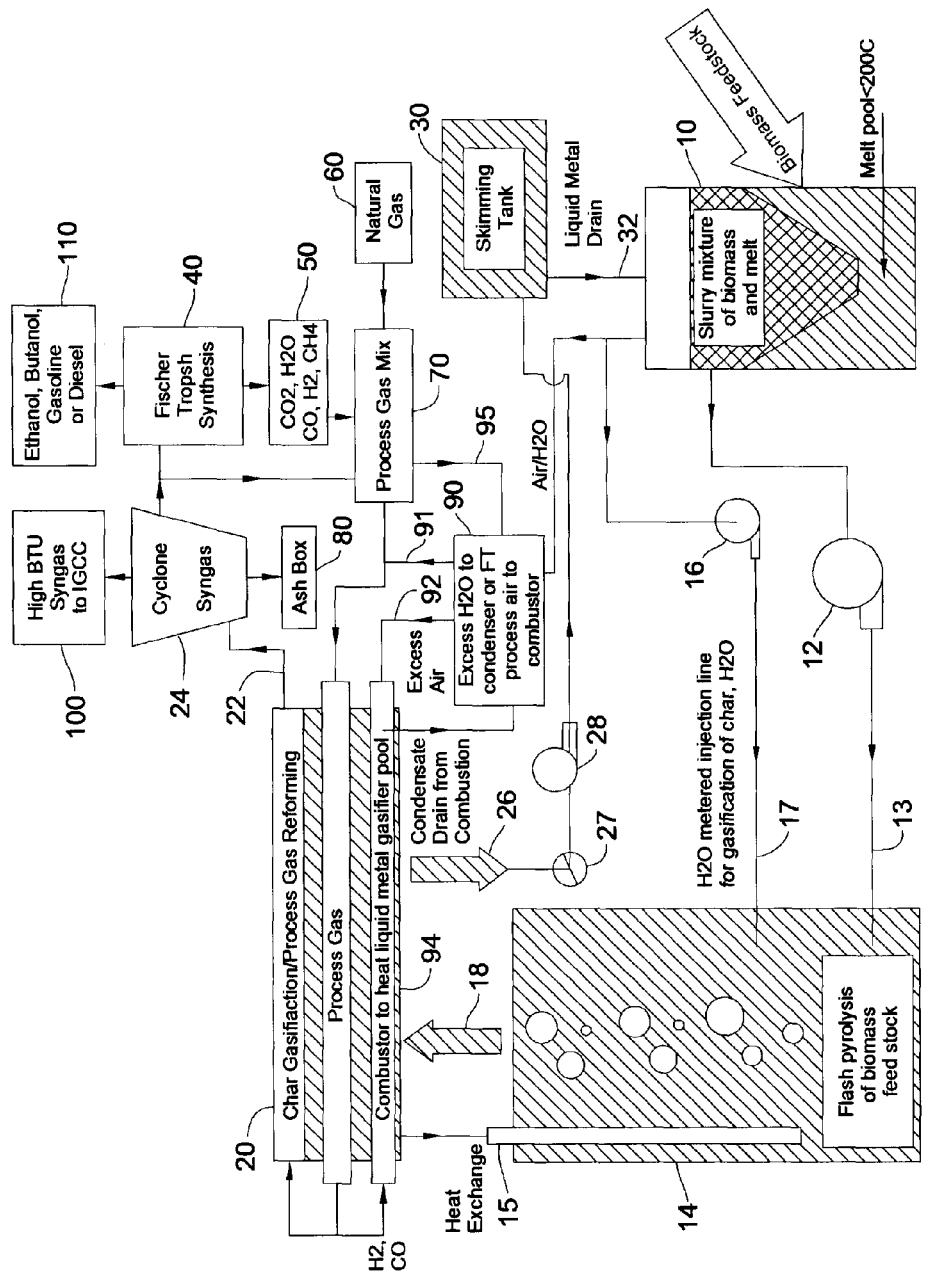
FIG. 1 is a schematic diagram of a first version of the present invention.

Overview:

In light of political instabilities, a growing world population, and the threat of global warming, there is strongly felt, worldwide emphasis on developing technologies to derive synthetic fuels ("synfuel") from renewable biomass. The present invention addresses this emphasis via a multiple-stage gasification apparatus. The first stage produces syngas by endothermic chemical reaction with gas-liquid separation processes (preferably in the absence of any catalysts) and the second stage produces a liquid synfuel such as ethanol, gasoline, or diesel from the syngas by exothermic processes involving a series of catalysts, gas separations and steam insertion. The critical technology to enable this two-stage approach at suitably large-scales is a high-volume method to produce syngas from biomass in the first stage of the process.

Fundamental mechanisms of biomass pyrolysis and gasification provide the clues to understanding the difficulty of producing syngas from biomass. As used herein, the term "syngas" refers to a gaseous mixture comprised primarily of CO and $H_2$, with additional minor components, including $H_2O$, $CO_2$, $CH_4$, $N_2$, and hydrocarbons. The term "biomass"

refers to the organic materials produced by plants and animals, such as leaves, roots, seeds, and stalks, as well as microbial and animal metabolic wastes (e.g., manure), without limitation. Common sources of biomass include (without limitation): (1) agricultural wastes, such as corn stalks, straw, seed hulls, sugarcane leavings, bagasse, nutshells, and manure from cattle, poultry, and hogs; (2) woody materials, such as wood or bark, sawdust, timber slash, and mill scrap; (3) municipal waste, such as waste paper and yard clippings; (4) energy crops, such as poplars, willows, switch grass, alfalfa, prairie bluestem, corn, soybean, and (5) coal, peat moss, and the like. The term "biomass-derived reactant" refers to any reactant that can be fabricated from biomass by any means now known or developed in the future, including (without limitation) polysaccharides, monosaccharides, polyols, oxygenated hydrocarbons, sugars, starches, and the like. The heating value of syngas is maximized when $H_2O$, $CO_2$ and $N_2$ are either removed from the product stream or are prevented from forming in the first instance. Similarly, the heating value of syngas increases in proportion to the ratio of hydrogen to carbon monoxide within the syngas. The biomass reactants described in the Examples presented below are lignocellulosic, and comprise approximately of 30% lignin (by weight) and 70% carbohydrate polymers (holocellulose) in the form of hemi-cellulose (polymers of C5 and C6-carbohydrates that are readily hydrolyzed to form simple sugars) and cellulose (mainly glucose polymers that are difficult to hydrolyze). These reactants serve as representative examples of biomass that can be used in the present invention.

For approximate analysis, holocellulose has been assigned the empirical formula, $C_6H_{10}O_5$, and lignin has been assigned the empirical formula, $C_9H_6O_2$ $(H_2O)(OCH_3)_{4/3}$. Both empirical formulas have a close correlation to their measured and calculated heat of combustion values. Dietenberger (2008) "Mechanistic Pyrolysis Kinetics of Solid Redwood Constituents Using a Modified Cone calorimeter Test," *Fire Safety Journal* (in press). If the wood structure is theoretically reduced to monomer units given by the empirical formulae (on a moisture-free, ash-free, and extractive-free basis) the molar fractions of lignin and holocellulose in woody biomass are, respectively, 25% and 75%. This gives an overall empirical formula for "generic" dry lignocellulose of $C_6H_{8.9}O_{4.1}$, which is in close agreement with the value conventionally used by the biomass community. Henrich & Dinjus (2002) "Tar-free, high pressure synthesis gas from biomass," *Expert Meeting on Pyrolysis and Gasification of Biomass*, Strasbourg, France, 30 Sep. to 1 Oct. 2002.

In a conceptual process beginning with dry distillation traditionally associated with very slow heating rates, the $H_2O$ is mainly taken out of the wood structure and what remains is a dry charcoal that retains most of the combustion heat of wood (because the emitted steam has no heat of combustion). The dry distillation process can also be completed in a matter of minutes with other volatile gases besides steam also emitted by drawing the biomass between two 80-mesh stainless steel screens immersed in a low-temperature, molten metal alloy bath at between 200° C. to 360° C. (depending on the quality of charcoal desired). See the Stamm patent, supra. Temperatures higher than 360° C. are evidently avoided as it corresponds to breakdown of the lignin, thus giving rise to phenol-based molecules within the tar that have a greater tendency for gumming. The breakdown of lignin that releases phenol-based molecules at lower temperatures (less than 360° C.) is enhanced by the presence of free moisture and air, which must be removed to avoid production of such gumming tar components. The fast pyrolysis process is also more easily achieved by a prior removal of free moisture because of the high loading of evaporative heat.

The next processing step is char gasification with steam to produce high-quality and approximately equimolar concentrations of CO and $H_2$ at around 1100° C. and 1.0 bar pressure. This syngas has a Lower Heating Value (LHV) of about 12.65 $MJ/m^3$). Excessive steam levels will promote the water-gas shift reaction, $CO+H_2O \rightarrow CO_2+H_2$, which has the effect of reducing the heat value of syngas unless steam can be condensed and $CO_2$ removed. The economic drawbacks to the conventional approach include the large endothermic heating required, the slow reaction rates of carbon gasification by steam as compared to direct pyrolysis, and the need for an external source of water.

If instead of dry distillation the dried biomass is dramatically heated to between about 400° C. and about 600° C., then the pyrolysis produces about 70 wt % tar and 10 wt % gas within the wood volatiles, and 20 wt % remaining as char (mostly carbon and ash). Because the volatiles produced under these conditions tend to have the overall empirical formula, $(CH_2O)x$, Dietenberger (2002) "Update for Combustion Properties of Wood Components," *Fire and Materials Journal*, 26:255-267, the equilibrium chemical balance at 1,000° C. and 1.0 bar pressure indicates that this volatile mixture will reduce to equimolar concentrations of CO and $H_2$. Syngas comprising a 1-to-1 ratio of CO-to-$H_2$ is a clean, medium calorific value (MCV) syngas.

In an efficient process giving higher heat value syngas, the char should be combusted in an external chamber to heat a thermal carrier such as sand, which is then circulated into the gasifier chamber for fast pyrolysis of the biomass. If there is excess heat from such combustion, some of the char can instead be gasified endothermically with steam to produce additional equimolar CO and $H_2$ to mix with the volatiles. Excess steam needed for this process also has the side effect of increasing the $H_2$ to CO molar ratio in the raw syngas via the water-gas shift reaction. This approach reduces slightly the heat of combustion of the resulting syngas due to increased $CO_2$ levels.

To produce a MCV gas at 1.0 bar without active use of oxygen to crack the tar conventionally requires using a circulating fluidized bed (CFB) (e.g. molten metal bath) with circulating sand and/or catalysts, and steam injection from the bottom of the gasifier chamber into the biomass feedstock. These and other fluidized bed concepts require separation devices for cleaning out the residual tar, soot, and undesirable gases in the "crude" syngas which has not been able to reach equilibrium at around 1,000° C. and 1.0 bar pressure. Conventional approaches to achieve fast pyrolysis of biomass and the corresponding MCV syngas at atmospheric pressures cannot contend with the gumming of the processes by the constantly changing tar component. Nor can conventional processes efficiently handle the char component. In these processes, sand as a heat carrier has an advantage in dealing with gumming problems. The gummed char on the sand particles can be combusted and then the hot, cleaned sand is recycled through the process.

The present invention improves conventional MCV syngas technologies by pyrolyzing a dried biomass reactant into gaseous form more completely. In complete gasification, the chemical makeup of lignin and holocellulose leads to additional methane in the syngas. The overall theoretical heating value of the resulting syngas (based on the empirical chemical formulae for cellulose, etc., given above) is 20.0 $MJ/m^3$. (Pure methane has a corresponding value of 38 $MJ/m^3$.) Under flash pyrolysis conditions, the yield of char using woody biomass (90 wt % birch and 10 wt % aspen; 25.4 wt % lignin and 74.6 wt % holocellulose) reached an averaged value of 10.4 wt % and was independent of: (1) the fluidizing gases, (2) pressures greater than 1.0 bar; and (3) temperatures greater than 650° C. The overall char yield of 10.4 wt % corresponds to 41 wt % char lignin and 0 wt % char holocellulose of the selected wood. This is in agreement with existing data on flash pyrolysis of cellulose and lignin as isolated components. See Fushimi et al. (2003) *Ind. Eng. Chem. Res.*, 42:3929-3936.

The Present Invention:

A major improvement on the current flash pyrolysis technology is to eliminate the need for an external water source and separation devices by radically altering the gasifier and combustion chambers. A significant advantage of the invention is related to its economics: it reduces the expense associated with maintaining separation devices and does not require access to water. Thus, the apparatus is far cheaper to assemble, operate, and maintain as compared to conventional gasification devices. Increasing the gasifier chamber temperature to about 1,000° C., and setting the pressure to about 10 bar leads to complete $CO_2$ and $H_2O$ gasification from within the biomass within seconds, rather than minutes. The presence of CO and $H_2$ in the product gas stream has an inhibition effect on the gasification of wood charcoal. Thus, at about 10 bar and less than about 800° C., the chemical equilibrium in the product gas stream is shifted in the direction of significant amounts of $CO_2$, $H_2O$, and $CH_4$, to promote maximal reaction with the carbon in the feedstock. At temperatures approaching or exceeding about 1,000° C. the chemical equilibrium shifts to significant amounts of $H_2$ and CO, thereby requiring an overabundance of $H_2O$ (from process gas) to react with residual carbon and $CH_4$ to yield CO and $H_2$. Alternatively oxygen gas or metal oxides may be utilized to reform the residual $CH_4$ and carbon into CO and $H_2$.

These factors support the approach utilized in the present invention, specifically: (1) flash pyrolyzing dried and compressed feedstock wafers by direct contact with a molten metal bath thermostatically maintained a temperature of between about 800° C. and about 1,000° C.; (2) gasifying the char and tar within the growing bubbles rising through the molten metal; the bubbles provide sufficient pressures (up to about 10 bars) and reaction times (about 10 sec) to consume the char and tar completely by residual gases present in the bubbles. and (3) a shifting of the chemical balance in the product stream to CO and $H_2$ due to the slowly decreasing pressure and increasing temperature in the rising bubble, which also allows reducing the active pressurization of the gasifier chamber.

Optionally, steam may be added to the forming product gas bubbles to enhance the gasification rate of the char. However, injecting steam decreases the heating value of the resulting product gas by increasing the $CO_2$ concentration.

Another fast pyrolysis version of the present invention is to pyrolyze the reactant dry biomass in a molten metal bath at a relatively low temperature, about 350° C. The relatively stable tar and gas are then conveyed away from the metal screens at temperatures above at least about 200° C. The gases are then mixed with process gas for pumping at high pressures through a pipe in the high-temperature liquid metal. This heats the process gas. The char produced is crushed and conveyed through a lock valve for where it is picked up by the hot, high-pressure process gas. The char and process gas is then converted to syngas in a gasification tube imbedded in the molten metal bath.

In this version of the invention, the molten metal is stationary and isolated in each chamber. All of the carbon in the feedstock is converted into gaseous form. The process is superior to conventional pressurized processes that generate MCV syngas because of its more effective use of the carbon in the feedstock and the smaller facility footprint that is achieved by using a molten metal bath.

Although other liquid-metal-based organic gasification processes has been proposed, none has deliberately achieved flash pyrolysis of thermally thin solids, and then used the rapidly emerging gas bubble to create an initial compression wave whose expansion causes complete gasification of the char and tar components by residual gases. Thus, the present invention provides an efficient, clean and high heating value syngas. The product syngas can be used for any number of purposes, including: (1) firing the external burner for the reaction chamber, (2) creating synfuel with specialized Fischer-Tropsch reactions; (3) generating electricity in a compact Solid Oxide Fuel Cell; and the like.

Because the apparatus required to execute the process has a very small footprint (relatively speaking), the inventive method can be implemented in a self-powered mobile unit. Cellulosic feedstock is introduced to the unit, and is converted to synfuel, electricity, cooled $N_2/CO_2$ exhaust, and excess water for irrigation. A portion of the synfuel is backward integrated to power and transport the mobile unit.

Continuous Gasifier—First Embodiment:

A first version of the invention is a continuous gasifier comprising four main chambers, each chamber having a distinct function. The following discussion is made in reference to FIG. 1, which is a schematic rendering of this first embodiment of the invention. A stirred mixing and drying chamber 10 mixes the biomass with a molten metal at a temperature range that causes rapid water evaporation from the biomass, yet is below the degradation temperature of the biomass. This temperature range is from 100° C. (i.e., the boiling point of water) to about 300° C., with a temperature of about 200° C. or less being generally preferred. Preferably, the biomass is inserted into mixing and drying chamber 10 at atmospheric pressure, near the bottom center of the chamber. The chamber's mixing blades ensure that the floating biomass is adequately mixed with the molten metal-biomass slurry exiting the chamber.

The molten metal-biomass slurry is then transferred under high pressure to the bottom center of a high-temperature pyrolyzing chamber 14. The chamber 14 contains molten metal and is maintained at a temperature of at least about 800° C. The transfer can be accomplished using any transfer mechanism and/or conduit now known or developed in the future for moving molten metal slurries, such as slurry pump 12 and conduit 13. For purposes of brevity, several pumps, conduits, and transfer mechanisms are mentioned throughout the description of FIG. 1. All of these pumps, conduits, and transfer mechanisms are conventional in design. Thus, moving the molten metal, gases, ash, slag, and the like from chamber to chamber can be accomplished using any mechanism now known or developed in the future for moving liquids, gases, and solids from place to place. Additionally, the system can be engineered to take advantage of gravity, thus eliminating the need for one or more of pumps 12, 16, and/or 28. The pumps are depicted in FIG. 1, however, to clearly delineate the direction of travel of the various materials.

The resulting bubbling producer gas reacts with (and partially gasifies) char and residue at the bottom surface of each bubble. Transfer mechanism (slurry pump) 16 and conduit 17 are provided for inserting pressurized hot process gas (comprising heated steam, recycled gas, stranded methane, or a combination thereof). The process gas is provided to augment char gasification and hydrocarbon reforming in the bubbles. The moving pyrolysis products and hot molten metal are then inserted via high pressure conduit 18 into an even hotter gasification chamber 20 that accommodates the generally longer gasification reaction times. Syngas is formed in gasification chamber 20 and migrates to the top of the chamber, where it is removed via conduit 22 and inserted into a separator 24, such as cyclone. A combustor 94 is provided to heat the molten metal within the gasification chamber 20. A heat exchanger, 15, is provided to backward integrate excess heat from the gasifier 20 to the pyrolyzing chamber 14.

After removal of syngas from the top of the gasification chamber 20 into the separator 24 (via conduit 22), the syngas can be used for any desired end purpose. Two exemplary uses are depicted in the upper right-hand corner of FIG. 1. The separator 24 functions to remove any remaining particulates from the product gas. The separator 24 is cooled sufficiently to condense any metal vapor, which then re-circulated to the pressurized pyrolyzing chamber 14 via conduit 26 and valve 27. The removed particulates are collected in ash box 80. The syngas at this point is quite clean due to the cleansing action of the liquid metal and high temperatures in the gasification chamber 20. The syngas can be used "as is" at this point, or passed through a carbon/ceramic filter if high-purity syngas is required. All or a portion of the syngas exiting the separator 24 can, for example, be used to power a generator 100, in which case the entire apparatus comprises an integrated gasification combined cycle (IGCC) generator. Alternatively all or a portion of the syngas exiting the separator 24 can be fed to a reactor 40 for Fischer-Tropsch synthesis (or any other suitable reaction). Fischer-Tropsch is presented in the figure as an exemplary reaction. The products of Fischer-Tropsch synthesis, some of which are shown in box 110, can then be used in any desired fashion (e.g., as liquid fuels, fuel additives, lubricants, etc.)

Molten metal from the gasifier 26 may also be recirculated back into the pyrolyzing chamber 14 by means of conduit 26 and valve 27. Some ash and carbon residues are drawn into the circulating molten metal. To remove this ash and residue, valve 27 also enables the circulating metal to be directed to a separator, such as the skimming tank 30. The molten metal can be transferred by transfer mechanism (slurry pump) 28. The skimmer 30 is provided to remove unreactive ash from the circulating molten metal. Clean metal is then recycled back into the mixing and drying chamber 10 via conduit 32.

A reservoir 70 and valve block 90 are provided to contain and direct process gas, excess steam and water, and/or air to various parts of the apparatus. These gases are directed to their desired location by conduit 91, 92, and 93. For example, air, water, or process gas can be directed into the gasification chamber 20. Similarly, if desired, natural gas from an external source 60 can be introduced into the process gas reservoir. Adding natural gas may be desired to increase the content of hydrogen within the gasification chamber 20.

Choices of Molten Metal:

The heat transfer carrier (molten metal) must remain a heavy liquid over a very wide temperature range. It also must be relatively non-reactive and non-evaporative under the operating conditions. The preferred metal is preferably a low-melting point metal, such as gallium (m.p. 29.8° C.), indium (m.p. 156.6° C.), lead (327.5° C.), bismuth (271.5° C.), or an alloy comprising one or more of these metals. The preferred alloys comprise binary mixtures of Ga and In or Pb and Bi. Ga 75.5/In 24.5 metal alloy is most preferred because it offers superb physical characteristics: a melting point (m.p.) of 16° C. and boiling point (b.p.) greater than 2006° C. Pure Ga is equally preferred to Ga-containing alloys, but is more costly than most Ga-containing alloys. The Ga/In alloy is also preferred because it is a liquid at room temperature. Thus a steam jacket is unnecessary to preheat and melt the metal alloy to start-up the biomass conversion process.

This self-starting feature reduces the overall size of the gasifier. Also, because the apparatus does not require a steam jacket, interruptions in gasifier operations have minimal impact on efficiency-it is not such a daunting task to cool the apparatus for maintenance, and then to bring the apparatus back up to operating temperature.

Other suitable metal alloys that can be used in the present invention have melting points above room temperature, and thus require using a steam jacket to prime the process. Thus, for example, indium has both a low reactivity and a suitably low melting point to be used in the present invention (m.p 156.6° C.; b.p. 2006° C.). Indium performs on an equal footing with both pure Ga and Ga-containing alloys, but is currently more expensive the either alternative (and is thus less preferred purely on economic grounds).

A non-lead, low-reacting, lower-cost metal alloy that can be used in the present invention is Bi 67/In 33 (m.p 109° C.; b.p. 1551° C.). Bismuth-indium alloys offer a wide non-degradation temperature range, with a suitably low melting point. The low melting point is a plus because it simplifies preheat process priming.

While lead and lead-containing alloys are less preferred because of toxicity concerns (and the concomitant regulatory hurdles involving the use of lead), lead and lead alloys function very well in the present invention (and are actually preferred in economic terms). At roughly $24/lb at current prices, lead and lead-containing alloys such as Bi 56/Pb 44 (m.p. 124° C.; b.p. 1551° C.) are very low-cost alternatives as compared to the metals previously described.

Other metal alloys having higher melting temperatures can also be used, provided that the biomass feedstock has a degradation temperature that is greater than the melting point of the alloy. As a practical matter, the molten metal should be selected from an element or alloy comprising a metal selected the group consisting of Ga, In, and Pb, as well as Bi Cd, Sn and Tl and combinations of any of these. If a higher melting point alloy is used, the pump 12 and conduit 13 must be chosen carefully to accommodate the higher temperature ranges. Thus, the invention will function with any metal or metal alloy that melts at a temperature less than the degradation temperature of the biomass reactant, which is non-reactive, and which has a boiling point greater than about 1,200° C. (and preferably greater than about 1,500° C.). Low or no toxicity is a plus, but not required.

Molten salts with a narrow liquid temperature range can be used in place of molten metals. For example, salts (and other ionic liquids) having a melting temperature below about 250° C. and boiling points above about 1,000° C. can be used instead of a molten metal. Many salts, including chlorides, nitrides, fluoroborates, and the like, fall within this description. For example, the eutectic mixture CuCl (65%)-KCl (35%) is a suitable molten salt that can be used in the present invention. It has a melting point of 150° C. and a boiling point of about 1,300° C. A distinct advantage of using molten salts or ionic liquids in place of molten metals is that it reduces the amount of potentially toxic heavy metals in the ash by-products. Molten ionic liquids for use in the invention need not be eutectic mixtures. A very large number of suitable single salts, binary salt mixtures, and tertiary salt mixtures have been characterized that fall within the parameters of having a melting temperature below about 250° C. and boiling points above about 1,000° C. Reference libraries containing thermodynamic data and phase diagrams are available commercially from many sources, for example, Material Science International, GmbH, Stuttgart, Germany.

Temperature Ranges:

The preferred temperature ranges for the four chambers are as follows: For the mixing and drying chamber 10 and the skimming chamber 30, the lowest temperature should be about 10° C. over the melting point of the alloy used. The highest temperature should be no greater than about 20° C. below the degradation temperature of the biomass feedstock.

For the pyrolyzing chamber 14 the lowest temperature should be the tar-cracking point (at least about 800° C. for woody feedstocks). The highest temperature within the pyrolyzing chamber 14 should be less than or equal to the temperature within the gasification chamber 20.

For the gasification chamber 20, the low temperature must be equal to or greater than the high temperature within the pyrolyzing chamber 14. The high temperature within the gasification chamber 20 should not be so high as to unduly shorten the lifetime of the equipment. Also the temperature should not so high as to melt the ash into clinkers (i.e. irregular, vitrified clumps of ash). In practice, the high temperature in the gasification chamber should not exceed about 1,200° C., and preferably should not exceed about 1,000° C. It is possible to achieve good gasification results at temperatures of about 800° C. when catalysts are used in the gasification chamber. Alternatively, oxygen and steam may be added to the raw syngas to reform $CH_4$ in a secondary gasification sub-chamber within the gasification chamber 20. This enables temperatures within the secondary gasification sub-chamber to exceed 1,200° C., while the liquid metal within the primary gasification chamber remains at a temperature below 1,000° C. Doing so limits the concentration of vaporized metals and prevents the formation of ash clinkers.

Choices of Pressures:

The pressure ranges for the four chambers are as follows: For the mixing and drying chamber 10, the lowest pressure is atmospheric pressure and the highest pressure is the upper pressure limit that can be tolerated by the equipment used to feed the chamber 10. The pressure in chambe 10, should be at least about 50% less than the pressure in any of the pyrolyzing chamber 14, gasification chamber 20, and skimming chamber 30.

The pressures within the pyrolyzing chamber 14, the gasification chamber 20, and the skimming chamber 30 are dependent, in part, on how the syngas produced is to be used. For example, if the syngas is to be combusted in an integrated gasification combined cycle generator (IGCC), the pressure in these three chambers should be about 5 to 15 atm. If the syngas is to be fed directly to an internal combustion engine, the pressure in these three chambers should be from slightly above atmospheric to about 3 atm. If the syngas is to be used for downstream Fischer-Tropsch synthesis, the pressure in these three chambers should be from about 15 atm to about 30 atm. Regardless of the ultimate use of the syngas, to ensure safe operating conditions, the highest pressure limit in any chamber must not exceed the safety margin below the burst pressure of the component within the system having the lowest burst pressure rating.

Choices of Gasifying Agents, Augmentation:

The products of pyrolysis formed in the gasification chamber 14 are developing producer gas and floating char. Both components are utilized as reactants in the gasification chamber for ultimate conversion into syngas. The primary gasifying agent for use in the present invention is steam because it is most readily available and has the least impact on the BTU value of the resulting raw syngas. The amount of steam injected must be balanced against two competing goals: (1) gasifying as much char as possible, without (2) reforming the methane and hydrocarbons that are already present in the raw syngas. Balancing these two competing goals yields the highest BTU producer gas possible, without reforming the methane and hydrocarbons.

The equivalent moisture content required to optimize the yield of syngas is dependent on the feedstock. For wood, sugars, and the like, little or no steam needs to be added. For carbon (i.e. coal), greater than about 108% equivalent moisture content should be introduced to the gasification chamber 20. For generic wood charcoal, greater than about 81% equivalent moisture content should be introduced to the gasification chamber 20. For plastics, such as poly(methyl methacrylate) (PMMA), greater than about 6% equivalent moisture content should be introduced, etc. The highest value of steam addition depends on maximizing $H_2$ and CO in the product gas and minimizing C, $CH_4$ and $CO_2$. In approximate terms, these equivalent moisture content values correspond to 0% for sugar, greater than about 11% for cellulose, greater than about 25% for wood, greater than about 150% for carbon (coal), greater than about 144% for generic charcoal, and greater than about 54% for PMMA, etc.

The gaseous augmentation with $H_2$ and $O_2$ to promote exothermic reactions within the gasification chamber 20, or metal-based catalyst augmentations are not preferred, and in the preferred versions are absent entirely. In the preferred process, the process proceeds in the absence of added $H_2$ and added $O_2$. However, when using a feedstock that is difficult to gasify, $H_2$ and/or $O_2$ may be used as follows: (1) $H_2$ and $O_2$ may be combusted to generate localized heat and/or to provide super-heated steam; or (2) $H_2$ may be inserted into pyrolyzing chamber 14 to assist in converting carbon to methane. At the same time, a sufficient amount of $O_2$ is then introduced into the secondary gasification sub-chamber of chamber 20 to convert the methane to syngas. The potential for cold spots in the reactor (which contribute to the formation of creosote from tar or powdery carbon—common problems in other reactor designs) is eliminated due to the high thermal conductivity of the molten metal.

The gasification reactions in chamber 20 may, however, be augmented with stranded methane feedstock, $CH_4$, from source 60. The added methane beneficially results in sufficiently high $H_2$ concentrations in the hot pressurized process gas to consider isolating only the $H_2$ portion for use in the combustor 94. In this approach, the flue gases vented to the atmosphere are comprised almost entirely of $N_2$ and $H_2O$. All or substantially all of the carbon from the biomass reactant, and the carbon from the introduced methane is converted to syngas. The output of $CO_2$ from the Fischer-Tropsch synthesis is completely recycled by inserting it into the process gas. The $CO_2$ is then reacted with a sufficient methane feedstock to form mainly $2 CO + 2 H_2$. Thus, all of the carbon in both the biomass reactants and the stranded methane feedstocks are converted to synfuel. In this fashion, the production of methane from landfills, livestock activities, vegetation decay, and other sources can be prevented from contributing to atmospheric warming. Of course, subsequent combustion of the synfuel itself will yield $CO_2$. $CO_2$, however, but is more easily recycled from the atmosphere (by the activity of photosynthetic plants) and has a much lower impact on global warming as compared to methane.

Choices of the Burner:

The structure and type of combustor 94 for use in the invention is not critical so long as the combustor can heat and maintain the molten metal in gasification chamber 20 at the required temperatures. It is preferred, however, that self-sufficiency and high efficiency at low cost be achieved when the off-gas from a one-pass Fischer-Tropsch Synthesis (FTS) reaction is used to fire the burner and the process heat from the FTS reaction is used for powering the integrated system. In FIG. 1, it can be seen that the off-gas from the FTS reaction is collected at reservoir 50 and then introduced to the reservoir 70 for injection into the combustor 94 via conduit 95, valve block 90, and conduit 92.

Choices of the Feedstock:

There are no limitations on the carbon-based, biomass feedstock mixes or moisture contents, as long as the restrictions on temperature, pressure, gasifying agents, and molten metals noted earlier are observed. At a minimum, however, the feedstocks should be chopped into thermally thin chips. This both improves heat transfer and allows the biomass to be augered into chamber 10 at an appropriate rate. Care should be taken to match the capacity of the skimmer 30 to the chosen feedstock if the feedstock has a high ash content. Otherwise, the accumulation of ash in the molten metal will overwhelm the ability of the skimmer to remove the ash from the apparatus.

Continuous Gasifier—Second Version

Figure 2:
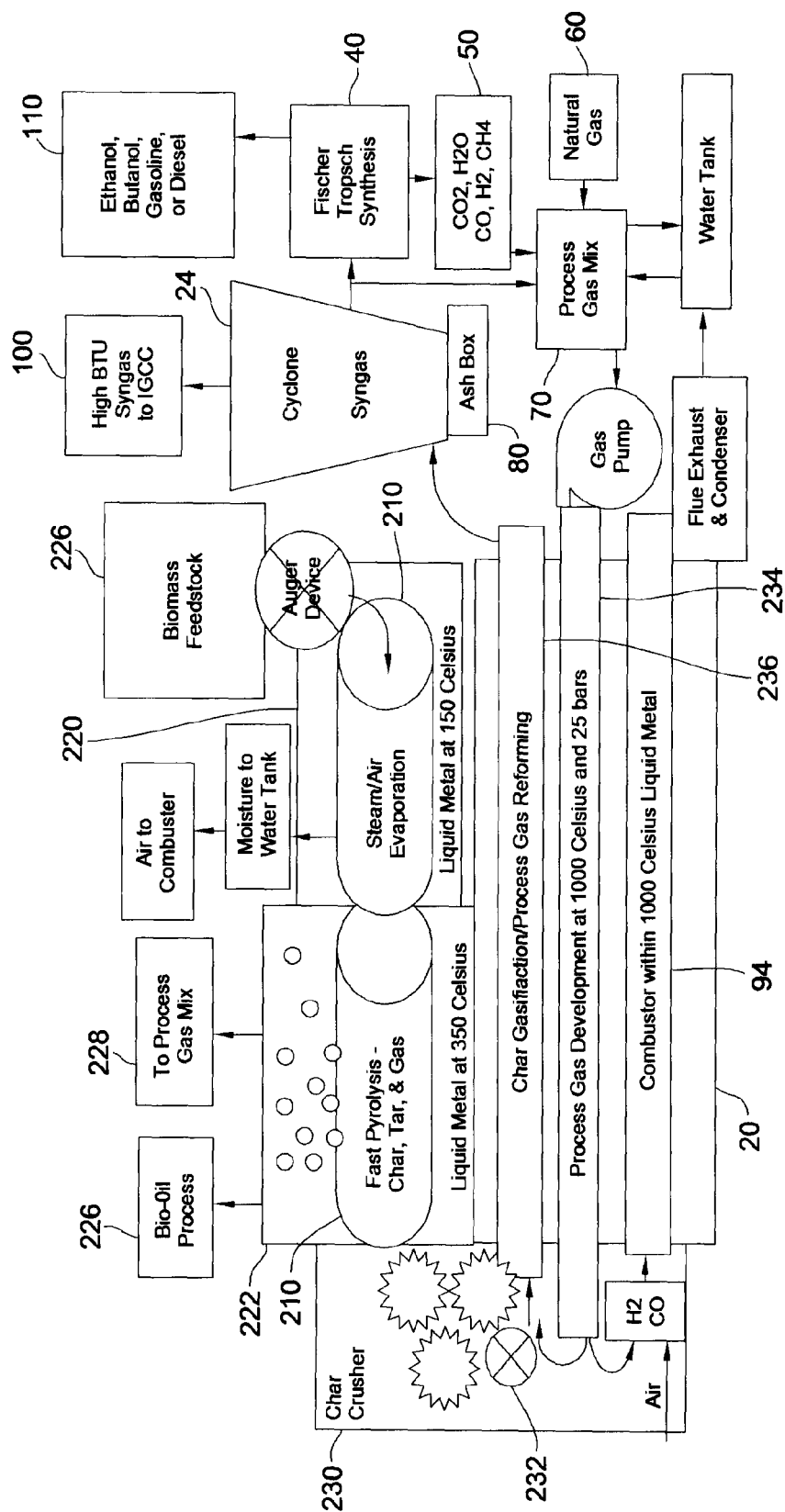
FIG. 2 is a schematic diagram of a second version of the present invention.

A second version of the present invention also has four main chambers serving different functions (see FIG. 2). However, in the second version of the invention, the molten metal need not be circulated and is not in direct physical contact with the feedstock. Here, a horizontal auger encased in a porous tube wall 210 is used to move thin layers of feedstock through an evaporation chamber 220 and then through a pyrolysis chamber 222, both of which contain static, molten liquid metal. Air and steam escape from the biomass as bubbles that pass through the porous tube wall and into the low-temperature molten metal bath. The porous tube wall is of a sufficiently small mesh to prevent molten metal from accessing the auger encased within the porous tube. A lock valve 224 separates the feedstock bin 226 from the inlet into auger 210. The gas pressure within chambers 220 and 222 is developed from the evaporated moisture.

After passing through evaporation chamber 220, the horizontal auger moves the now-dried feedstock into a pyrolysis chamber 222 to achieve fast pyrolysis at moderate temperatures Like the moisture in chamber 220, in chamber 222, combustible volatiles from dried biomass escape though the porous tube walls and into the hotter molten metal. Catalysts may be mixed into the stationary molten metal for catalyzing degradation of the volatiles into simpler molecules. This prevents the formation of creosote deposits in the "producer gas." The so-developed producer gas is ideally suited to be condensed as bio-oil 226 for fuel or inserted as part of process gas 228 for making syngas.

The developing char is moved along and dropped into a vertically downward auger 230 that crushes the now-fragile remains of the biomass feedstock. Another lock valve 232 is used to achieve pressures as high as about 20 atm. This pressure is used to move the crushed char into a gasification chamber 20. The producer gas may be mixed with the steam (air-removed) from the drying chamber 220, syngas output from separator 24, stranded methane introduced from methane source 60, the output from Fischer-Tropsch 40, or steam from a reservoir 50 in such a combination so as to make an ideal process gas mixture 70 that is pumped to high pressure, about 20 atm.

The process gas is then inserted into a process gas tube 234 immersed in the high-temperature molten-metal bath within the gasification chamber 20, causing further beneficial changes to the process gas. The exit of the process gas tube 234 is at high pressure, as well as at high-temperature. This high-pressure and high-temperature gas exiting tube 234 entrains the crushed char exiting from the second lock valve 232 and conveys it into a gasifying horizontal tube 236 immersed within the high-temperature molten-metal bath within chamber 20.

The endothermic heat required for reforming the process gas and gasifying the crushed char is provided by tubular combustor 94 disposed within gasification chamber 20, or can be provided directly by combusting $H_2$ and $O_2$ (in, for example, a micro-chamber) to make super-heated steam. The drying chamber 220 and the pyrolysis chamber 222 are situated above the gasification chamber, with appropriate separation walls interposed to maintain various required temperatures within the separate chambers. The raw syngas exiting the gasification tube 236 is inserted into a separator 24 as described previously.

Choices of Liquid Metal:

In the second embodiment, the choice of liquid metal is more flexible because the metal itself is not circulated through the device. Indeed, because of the stationary nature of liquid metal, the metal can be selected based on the needs of the specific chamber where it is being used. For example, there is far less concerns with using lead in the gasification chamber 20 because the chamber can be hermetically sealed. Also a steam jacket is not needed around the various chambers, because this second embodiment of the invention is inherently self-starting. Thus, for example, the unit can be shutdown over a weekend (for maintenance) without losing efficiency. The various chambers should, however, be surrounded by highly insulating coverings to promote high thermal efficiency.

Choices of Temperatures:

The temperature ranges for the four chambers are as follows. For the drying chamber 220, the lowest temperature should be no less than about 10° C. over melting point of the metal disposed in chamber 220. The highest temperature should be no more than about 20° C. below the feedstock degradation temperature.

For the pyrolysis chamber 222, the lowest temperature should be the feedstock degradation temperature (about 200° C. for wood) and the highest temperature should be consistent with the desired producer gas to be made. For the gasification chamber 20, the high temperature should be below the point at which the ash melts into clinkers. Practically speaking, the high temperature should not exceed about 1,200° C., an more preferably should not exceed about 1,000° C. As noted for the first version, it is possible to lower the operational gasification temperatures by using catalysts.

Choices of Pressures:

The pressure ranges for the four chambers of the second embodiment are as follows: For the drying chamber 200 and the pyrolysis chamber 222, the lowest pressure is atmospheric pressure; the highest pressure is what can be tolerated by the lock valve 224 and the biomass auger 210. The lowest pressure in the gasification chamber 20 and separator 24 is again dependent on the use to which the syngas will be put. These pressure ranges are the same as those given above for the first version of the invention.

Choices of Gasifying Agents and Augmentation:

The primary gasifying agent in the second version of the invention is steam, again because it is most readily available and has the least impact on the BTU value of the resulting raw syngas. These values are the same as given above for the first embodiment of the invention.

Likewise, augmentation with added methane is as described in the first version of the invention. As in the first version of the invention, augmentation with added $H_2$ and/or $O_2$ can be beneficial in certain instances.

Choices for the Combustor:

The second version of the apparatus can use any combustor that can achieve the required maximum temperature in the gasification chamber 20. However, self-sufficiency and high efficiency at the lowest cost is achieved when the off-gas 50 from a one-pass efficient Fischer-Tropsch Synthesis (FTS) reaction is used to fire the combustor 94 and the process heat from the FTS reaction is used for powering the integrated system.

Choices of the Feedstock:

There are no limitations on the carbon-based, biomass feedstock mixes or moisture contents, as long as restrictions on temperature, pressure, gasifying agents, and liquid metals are observed. The feedstocks should be chopped into thermally thin chips that can be easily augered into the device at an appropriate rate.

Tables 1 and 2 present data for the net reaction of woody biomass to ethanol and the net reaction of woody biomass to octane, respectively, for various gasification technologies. The present invention improves upon prior art gasification technologies by obtaining higher efficiency levels and does not utilize an external water source. The steam for injection in the present invention is provided by recycling the evolved steam captured in the first molten metal bath and from the water by-product of Fischer-Tropsch synthesis.

TABLE 1

Net reaction for woody biomass, $C_6H_9O_4$, to ethanol, $C_2H_5OH$.

| Technology Level Of Gasifier | Efficiency Percent | $H_2$ Moles | $C_2H_5OH$ Moles | $H_2O$ Moles | $CO_2$ Moles | Fuel Production Gallons/DryTon |
|---|---|---|---|---|---|---|
| Current CFBs and Flue Output | 50 | 0 | 1.04 | −0.88 2.25 | 0.92 3.0 | 100 |
| Self-Sufficient Heat and Flue Output | 80 | 0 | 1.66 | −1.4 0.9 | 1.46 1.2 | 161 |
| Use External Heat and External Water | 100 | 0 | 2.08 | −1.75 | 1.83 | 202 |
| Use External Heat and External $H_2$ | 144 | −5.5 | 3 | 1 | 0 | 291 |

TABLE 2

Net reaction for woody biomass, $C_6H_9O_4$, to iso-octane, $C_8H_{18}$.

| Technology Level Of Gasifier | Efficiency Percent | $H_2$ Moles | $C_8H_{18}$ Moles | $H_2O$ Moles | $CO_2$ Moles | Fuel Production Gallons/DryTon |
|---|---|---|---|---|---|---|
| Current CFBs and Flue Output | 50 | 0 | 0.25 | 0 2.25 | 1.0 3.0 | 68 |
| Self-Sufficient Heat and Flue Output | 80 | 0 | 0.4 | 0 0.9 | 1.6 1.2 | 109 |
| Use External Heat Only | 100 | 0 | 0.5 | 0 | 2 | 136 |
| Use External Heat and External $H_2$ | 150 | −6.25 | 0.75 | 4 | 0 | 204 |

EXAMPLES

The following Examples are included solely to provide a more complete description of the invention disclosed and claimed herein. The Examples do not limit the scope of the invention in any fashion.

Bench-Scale Test Equipment:

To provide a scale-up relationship with a pilot-scale gasifier, a bench-scale reactor according to the present invention was fabricated and used to test flash pyrolysis results using varying sizes of feedstock wafers and varying feedstock moisture levels. The test device included a primary molten-metal chamber deep enough to test various reaction pressures and reaction times. The device likewise included a host of sensors so as to characterize the process with dynamic measurements of heating and syngas bubble growth. The test device also was able to measure the contents of the developing and bursting syngas bubble to measure the degree of biomass conversion.

Liquid Metal Bath Chamber and Heating:

The main variable affecting the dimensions of the molten metal bath chambers for compatibility to a pilot-scale test is the rise time and size of the developing bubbles. Because the syngas present in the bubbles should not react with the liquid metal itself, the chosen metal must be substantially inert with the chosen biomass reactant. As noted earlier, Sn, Ga, Cd, In, Tl, Pb, and Bi are preferred as the most practical metal alloying elements (both technically and economically). It must be noted, however, that elemental tin (Sn) reacts with steam and air at higher temperatures Thus Sn is useful primarily for lower temperature baths and as an alloying metal, rather than a primary metal. From a technical standpoint, Ga, In, and Tl are ideal non-reacting liquid metals that come from the same column of the periodic table. From an economic standpoint, however, the very high cost of these metals is a practical consideration.

Elemental Ga has the highest temperature range in which it remains a liquid: from 30° C. to 2,237° C., thus it is ideal for use in the present invention. Indium is also ideal; the temperature range in which it remains a liquid extends from 157° C. to 2,006° C. Non-reacting and low-costing alloy metals with Pb and Bi are also very good for use in the present invention. The alloy Bi 55.5/Pb 44.5 (melting point 124° C., density 10,440 kg/m$_3$) and Pb 54.5/Bi 45.5 (melting point 160° C.; density 10,590 kg/m$_3$) are particularly preferred alloys of this type.

Using these densities, and with a goal of achieving a pressure of 10 bars above atmospheric pressure at the bottom of the bath equates to a chamber height of 9.8 m, which is impractical for bench-scale testing. To make the bench-scale device suitably small, pressured $N_2$ gas was channeled to the gas chamber above the liquid metal to obtain the desired pressure at the immersion depth.

Figure 3A:
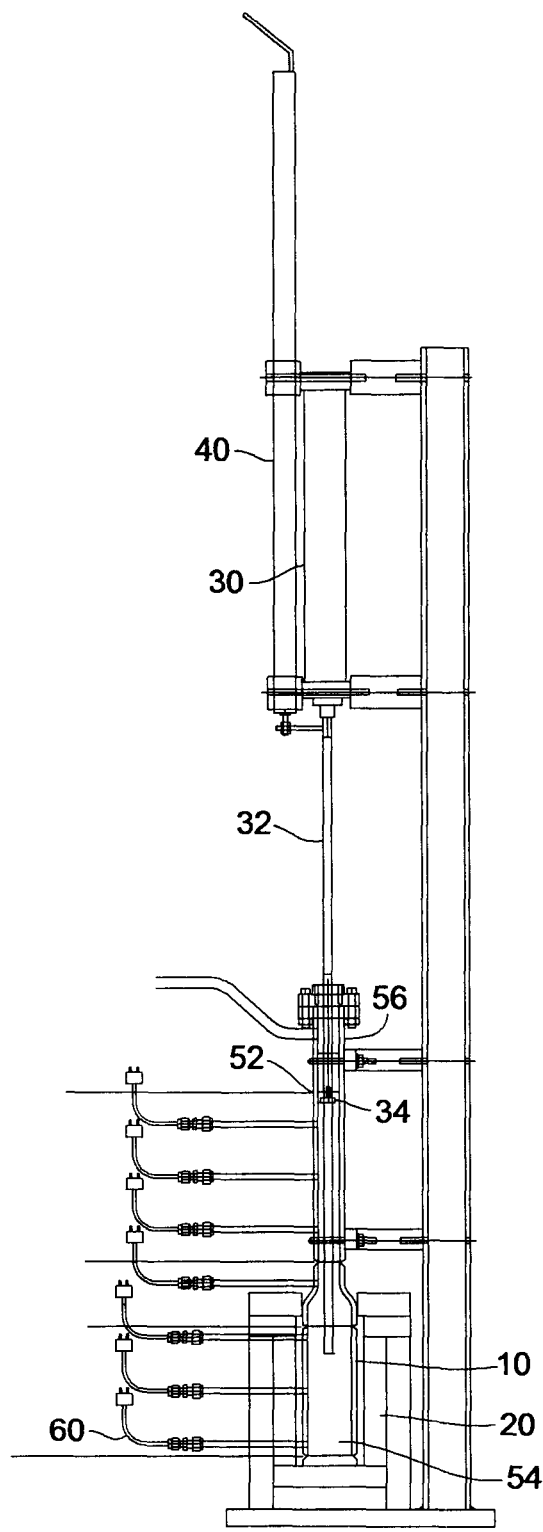
FIG. 3A is a schematic diagram of a bench-scale gasifier according to the present invention.

Thus, FIG. 3A depicts a schematic of a bench-top test device that was used to prove the feasibility, functionality, and utility of the present invention. The test device depicted in FIG. 3A was used to determine the extent of pyrolysis and to determine optimum wood chip configuration and the resulting gas combustion energy content, tar and char formation as a function of heating rate. As shown in FIG. 3A, the comprises a bottle-shaped test section 10, disposed within a suitable heater, 20, and containing the molten metal, such as the eutectic PbBi. A pneumatic piston 30 with a linear displacement transducer 40 injects the sample from the low-temperature top portion 52 to the high-temperature region bottom portion 54. A gas space 56 above the top of the molten metal column provides for liquid metal surface movements and for gas analysis.

The bottle-shaped construction was determined (via a computational fluid design calculation) to maintain a 1,000° C. reservoir at the bottom 54 of the test section and a 150° C. melt at the top 56 of the neck of the bottle.

To mimic how the process would be implemented at full scale, the wood samples were presoaked in the low-temperature PbBi alloy. The presoak mirrors the commercial-scale process in which the biomass reactant is premixed with a low-temperature molten metal (e.g., at temperatures <200° C., temperatures that cause negligible pyrolysis and oxidation) of the reactants. Similarly, the test equipment of FIG. 3A, the reactant can then be plunged into the lower, hotter section of the reactor. This mimics injecting a slurry mixture from, for example, chamber 10 in FIG. 1, into chamber 14 of FIG. 1. The test reactor of FIG. 3A achieves comparable high heat transfer rates and thus efficient and complete pyrolysis. The test device shown in FIG. 3A also allows any water content and air initially in the biomass reactants to be bubbled out, thus increasing the combustion energy content of the resulting syngas. The design of the test device allows high-speed insertion of the biomass reactants into the high-temperature portion 54 of the test device. (The free surface between the $N_2$ cover gas above the metal and the molten metal itself has already been broken by inserting the reactants beneath the surface of the metal in the top portion 56 of the reactor.)

The test samples (a wood chip) is placed in a holding cage 34 (with a pointed base shield to maintain sample integrity while in motion) attached to the end of the rod 32 connected to the pneumatic cylinder 30. A thermocouple (not shown in FIG. 3A) is also inserted down the hollow stainless steel rod and placed at the end next to the test sample to monitor the temperature as a function of time. The cylinder 30 is operated by a pneumatic valve and the pressure on the cylinder can be adjusted to measure the effects of varying the rate of insertion (i.e., different temperature gradients). The estimated minimum full extension time of 100 ms to cover 0.3 m corresponds to a 3 meters/sec velocity.

A split radiant heater 20 is placed around the test section in the lower high-temperature region 54. The transition region between regions 56 and 54 is insulated and the upper portion 56 is convectively cooled to maintain a temperature gradient such that at the top of the liquid metal in the reactor is held at about 150° C. Initial conduction and convection analysis using a commercial computational fluid dynamics program indicated that a suitable temperature gradient is obtained in the test device and that by necking down the throat of the reactor chamber, two convection cells developed: one in the upper cooled portion 56 and one in the high-temperature lower region 54.

The test device is equipped with an array of thermocouples evenly spaced along the height of the molten metal bath to measure the actual temperature gradient. As noted previously, an additional thermocouple is also fed through the injection tube and situated just above the test sample.

The gas space above the liquid metal surface is purposefully small so that the headspace can be evacuated and pressurized quickly. After the sample is inserted into its cage, the piston 30 is activated to immerse the sample into the top portion 56 of the reactor (150° C. PbBi alloy). The water vapor and residual air in the reactant is allowed to evolve. The headspace is then evacuated and purged with $N_2$ to prepare for rapidly immersing the sample into the high-temperature region 54 of the reactor. The headspace can be pressurized with $N_2$ to the desired pressure at any desired time prior to sample injection. Using thermocouples and pressure sensors in the headspace, the changing volume of the evolving gases can be deduced through the gas law. Thus the growth of bubbles is monitored indirectly through the movement of the liquid metal surface which decreases the volume of the headspace. Bubble-bursting events are detected by the temperature measurement within the gas chamber.

Because bubble movement is inconsistent and has a distribution, an independent means of measuring the liquid metal surface movement is needed to monitor remaining bubbles within the liquid metal. This is accomplished using an X-ray system that has been previously shown to capture two-dimensional liquid lead heights as a function of time. The rise in the liquid metal surface is linked to bubble volume growth and the lowering of the liquid metal surface is linked with bubble bursting, all of which can be obtained from the X-ray images. See Anderson et al. (2005). "Liquid-Metal/Water Direct Contact Heat Exchange: Flow Visualization, Flow Stability, and Heat Transfer Using Real-Time X-Ray Imaging," *Nuclear Science and Engineering* 150:182-220.

After bubble bursting is completed, the pressurized gas chamber is tapped to fill an evacuated sample bottle in a cooled water bath. The gaseous content of each sample bottle is then measured and analyzed. Typical analyses include mass spectroscopy and gas chromatography. The condensed tar/water portion is dissolved in a solvent for chemical analysis.

After a test run is completed, the reactor chamber is carefully depressurized, cooled, and opened. The linings of the gas chamber, the sample cage, and the surface of liquid metal are examined closely and scraped clean of any deposits. The resulting ash, char, and condensed tar (if any) is collected, weighed, and dissolved in a solvent for chemical analysis. To evaluate the gasification performance, the tested sample is weighed and its chemical and structural composition known prior to testing.

Figure 4:
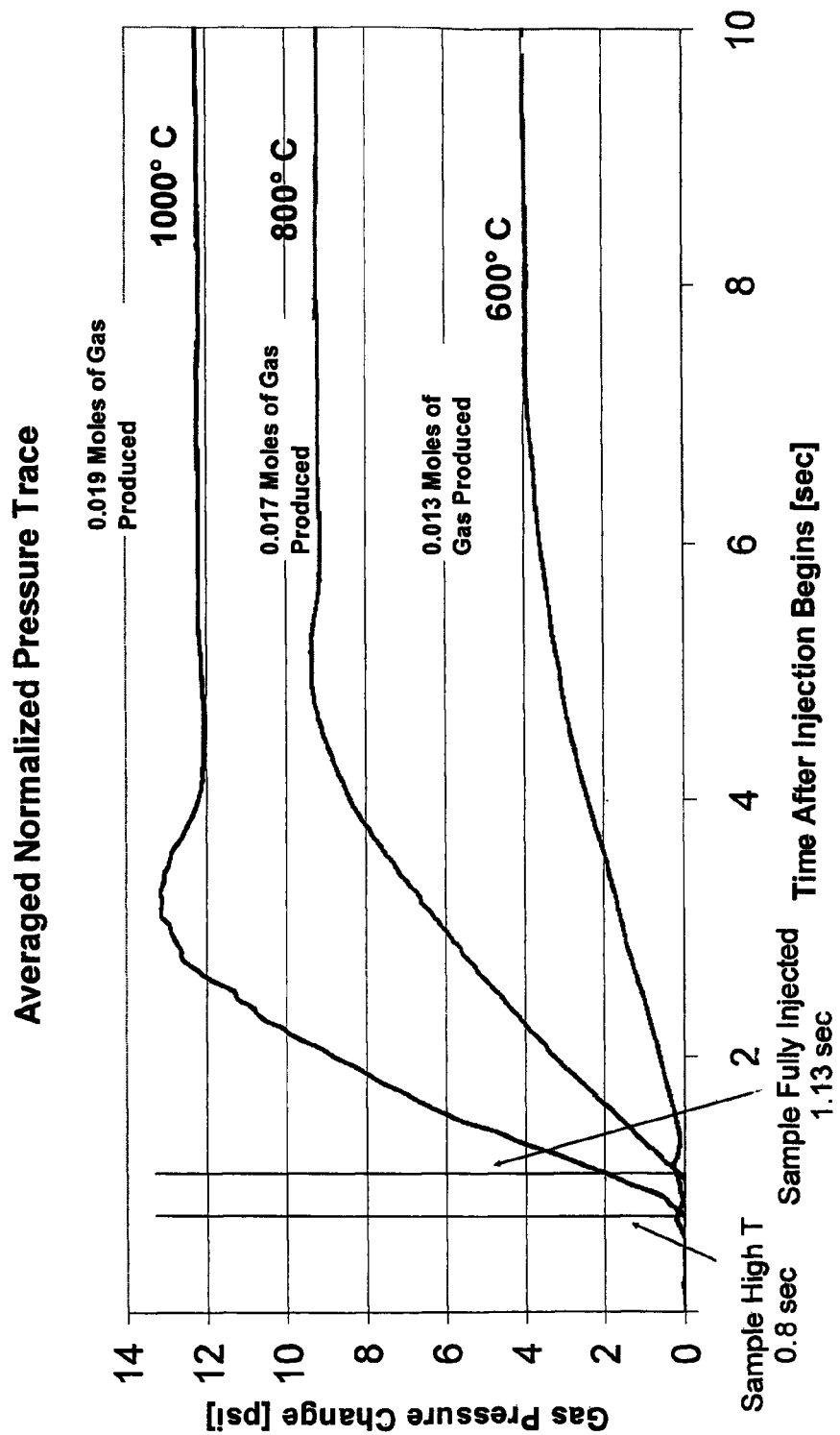
FIG. 4 is a graph depicting the average normalized pressure for pyrolization of wood samples using the test device depicted in FIG. 3A.

Using the test device depicted in FIG. 3A., wood samples were pyrolyzed and various measurements taken. FIG. 4 depicts the average normalized pressure trace for the pyrolysis reaction at three different temperatures: 600° C., 800° C. and 1,000° C. To generate these data, the samples were inserted into the top of the device shown in FIG. 3A. The device itself was charged with a lead bismuth alloy. The lower area 54 of the reactor was heated to the desired temperature (600° C., 800° C., or 1,000° C.). The upper area of the reactor 56 was temperature controlled to remain at 150° C. Each sample was then immersed underneath the molten metal in the top portion of the reactor. It was allowed to remain in the top portion of the reactor until the evolution of bubbles (steam) ceased. The reactor was then sealed and the sample plunged to the bottom of the bath using cylinder 30 and rod 32. The pressure was then monitored as a function of time.

As can be seen from FIG. 4, complete pyrolysis occurs very quickly. At all three temperatures tested, a steady pressure trace was achieved in less than about 10 seconds. For the reactions at 800° C. and 1,000° C., complete pyrolysis occurred in roughly 5 seconds.

Figure 5:
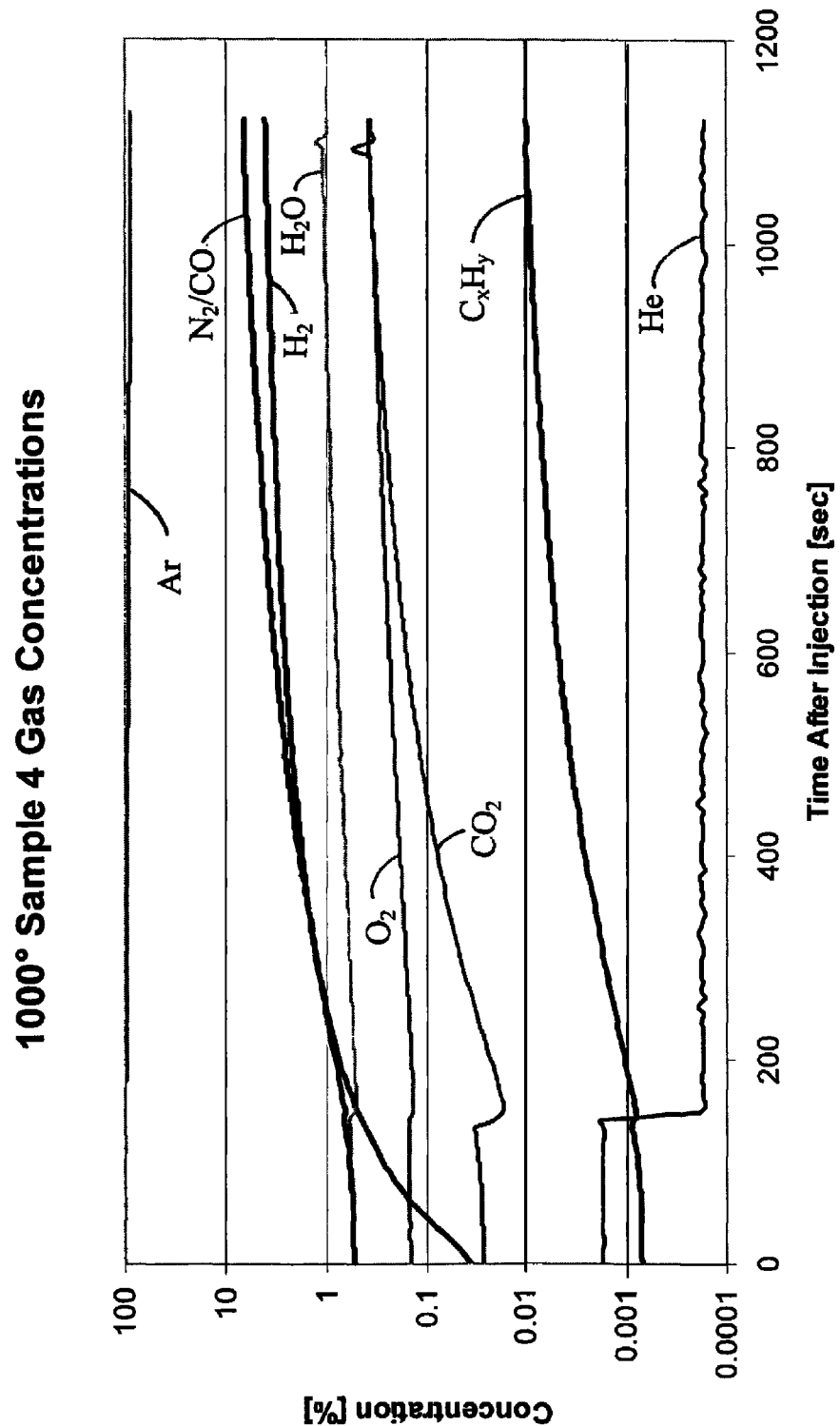
FIG. 5 is a graph depicting product gas concentrations for a test run at 1,000° C. and using wood as the biomass reactant.

FIG. 5 depicts the typical product gas composition for reactions using wood as the biomass reactant, and pyrolyzing the sample at 1,000° C. Included among the raw gas products are hydrogen, carbon monoxide, and hydrocarbons, thus demonstrating that the process can be used to produce syngas.

Figure 3B:
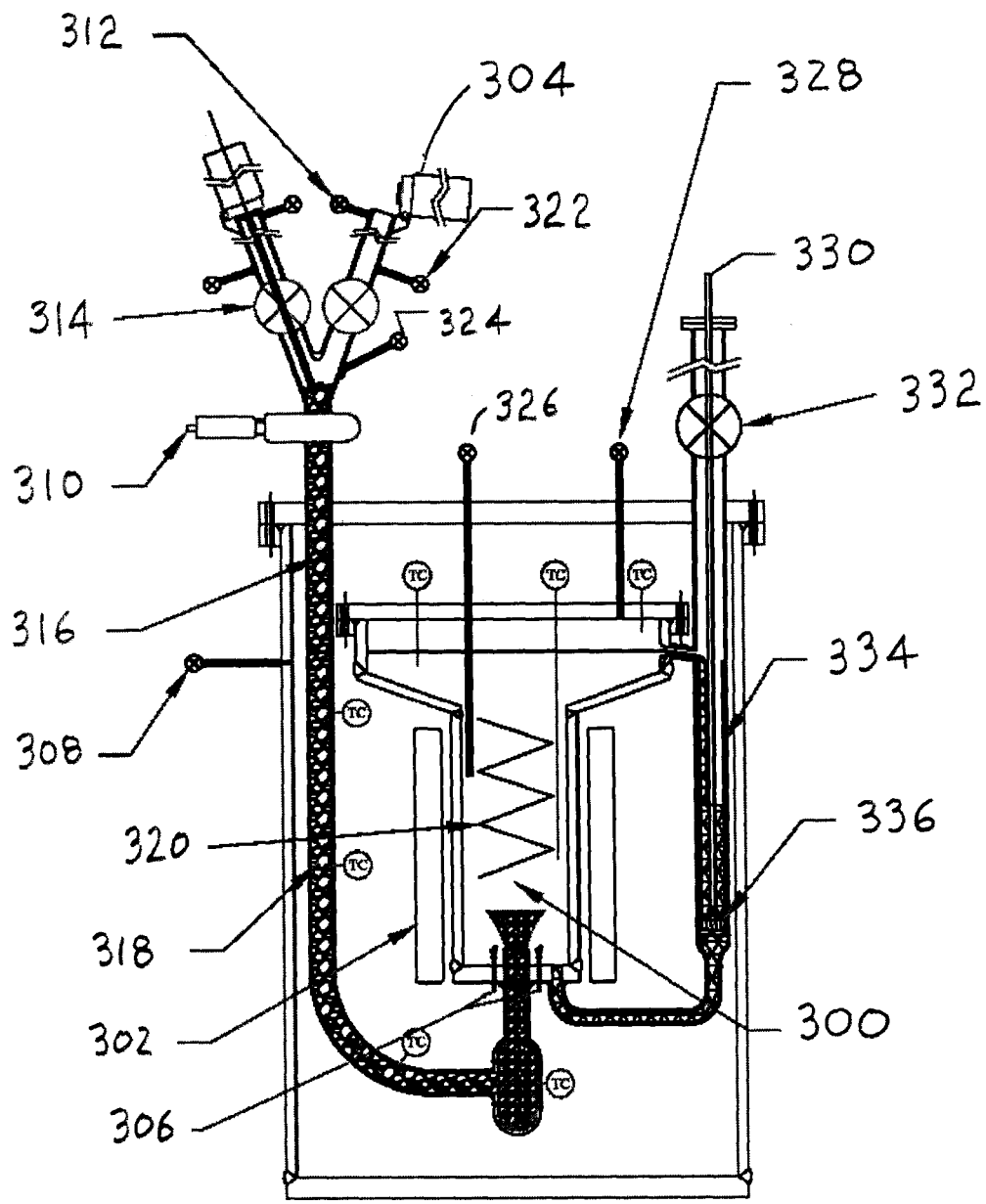
FIG. 3B is a schematic of another gasifier according to the present invention.

FIG. 3B is schematic diagram of a continuous reactor that incorporates many of the features of the test apparatus depicted in FIG. 3A. The reactor shown in FIG. 3B, however, makes better use of gravity to feed the reactants into the device (thereby limiting the number of pumps required). The device show in FIG. 3B also includes baffle plates with the molten liquid main chamber to control the velocity of the biomass and gas bubbles within the molten liquid pool.

The apparatus depicted in FIG. 3B includes a reaction chamber 300 containing a molten liquid. The designation "TC" throughout the drawing denotes a thermocouple to monitor the temperature of the device at various points. Baffle plates 320 are included within the chamber 300 to control the biomass and bubble rise velocity. A biomass feed inlet 304 is provided to introduce the biomass reactants into the chamber 300. Various ancillary control mechanisms are included to control the rate of reactant introduction into the chamber 300 and the pressure within the chamber. Thus is provided feedstock pinch valve 310, steam bleed valve 312, feed tube isolation valve 314, pressure equalization valve 322, and steam relief/recycle valve 324. Containment inert gas pressurization valve 308 is provided to pressurize the safety container. Unsaturated biomass feedstock travels through tube 316 and gradually becomes saturated with steam at distal end 318. The biomass than passes into chamber 300.

At this point, the biomass is introduced into chamber 300, along with hydrogen, water, oxygen, or carbon dioxide, which are introduced into chamber 300 via injection ports 306. Hydrogen may also be introduced into chamber 300 via feed 326. Syngas formed in the pyrolysis reaction is removed from chamber 300 via valve 328.

The molten liquid bath is maintained via a recirculation circuit comprising pump drive shaft 330, which is operationally linked to a clean-up loop impeller 336 disposed near the bottom or reaction chamber 300. The recirculation circuit can be closed via valve 332. A removable mesh 334 is inserted into the circuit to trap ash and other impurities that are formed within chamber 300. In this fashion, molten liquid is drawn from the bottom of chamber 300, passed upward through the mesh 334 (via the action of the impeller 336) where it is thereby filtered, and then deposited back into the top of chamber 300. The device shown in FIG. 3B is designed to be operated continuously.

Figure 6:
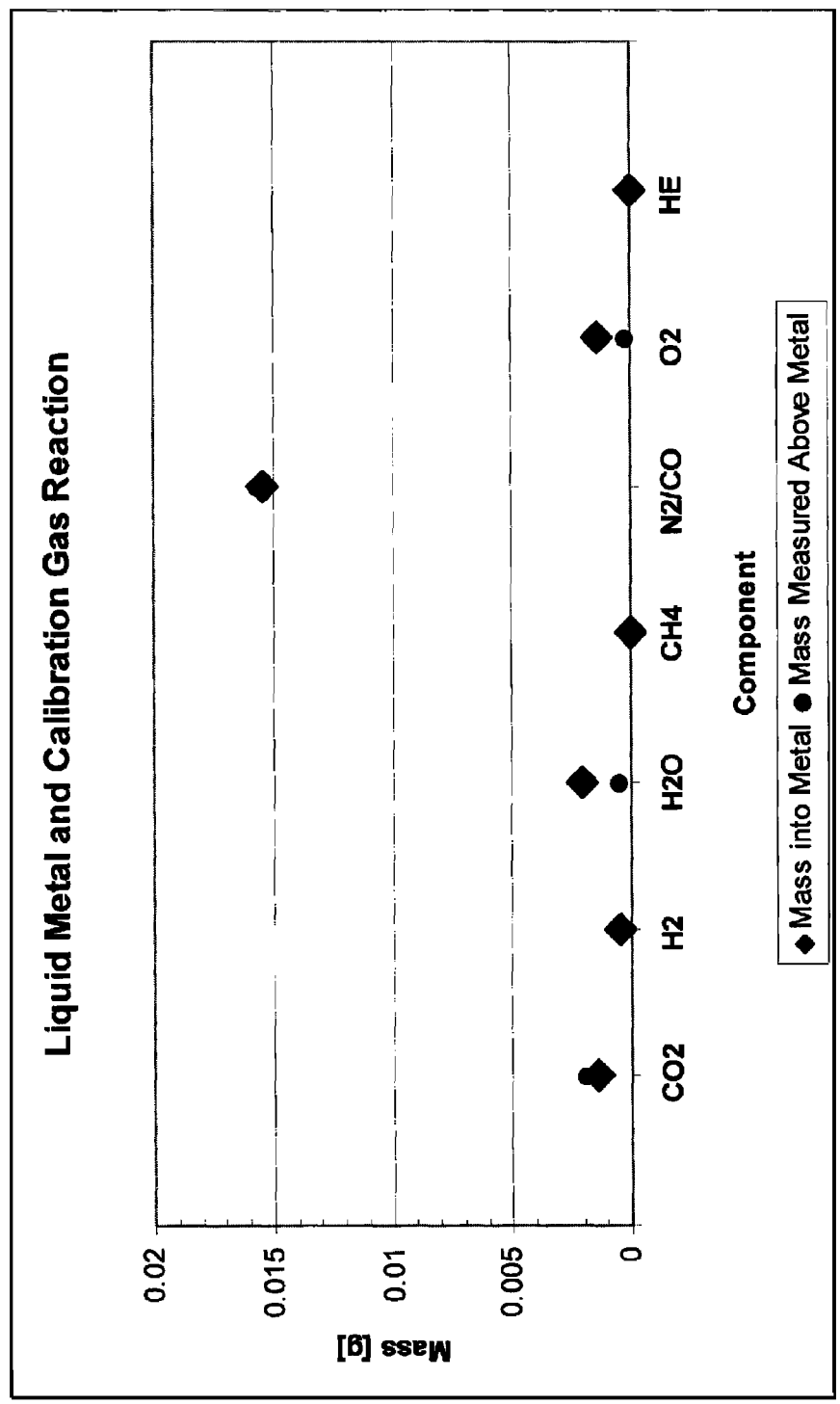
FIG. 6 is a graph depicting gas reaction rates and hold-up when using the present invention with a molten metal bath comprising a eutectic mixture of Bi (55.5 wt %) and Pb (44.5 wt %). The gas samples tested comprised Ar (86.52%), $CO_2$ (0.504%), $H_2$ (3.960%), $CH_4$ (0.010%), CO (6.960%) and $O_2$ (0.48%). The experiments show that at temperatures up to about 1,000° C., there are significant reactions with $O_2$, but essentially no reaction of $H_2$ or CO.

FIG. 6 depicts the results of an experiment wherein gas samples of Ar (86.52%), $CO_2$ (0.504%), $H_2$ (3.960%), $CH_4$ (0.010%), CO (6.960%), and $O_2$ (0.48%) were used to determine the gas reaction rates and hold up in a reaction according to the present invention using a molten metal bath comprising Bi (55.5) and Pb (44.5). The experiments were conducted to determine if the gases would undergo any significant reactions with the molten metal bath itself. Thus, before and after values were taken to measure the masses of each gaseous entity within the metal bath itself and in the headspace above the molten metal bath. Experiments found that there were significant reactions of oxygen with the metal to yield metal oxides, e.g. lead (II) oxide (PbO), etc. However, there were essentially no reactions of $H_2$ or CO with the eutectic alloy at temperatures up to 1,000° C.

Figure 7:
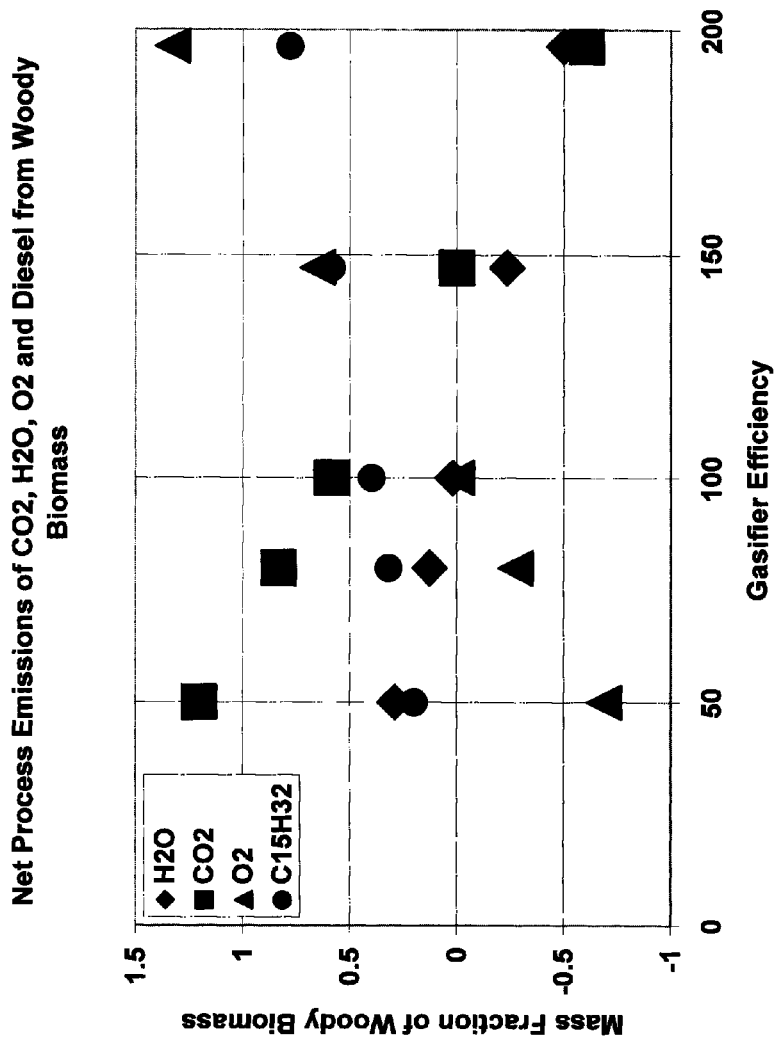
FIG. 7 is a graph depicting the net process emissions of $CO_2$, $H_2O$, $O_2$, and diesel from woody biomass.

Efficiency, Emissions, and Economics:

FIG. 7 is a graph depicting net process emissions for the chemical reactions required to produce diesel (with the formula $C_{15}H_{32}$) from woody biomass, as the biomass energy percentage varies. As can be seen from FIG. 7, it is beneficial, from the ecology standpoint, to nudge gasifier productivity to higher values. For example, at 100% biomass energy conversion to FTS products, the need for oxygen (filled triangle points) to oxidize with biomass is, by definition, zero; the production of water (filled diamond points) decreases to a small 2% emission, the production of $CO_2$ (filled square points) is reduced to 58% emission, and the diesel output (filled circle points) increases gradually to 40% of the biomass (by weight).

At the theoretical limit of the gasifier/synthesis conversion of biomass, which for diesel is 147%, all of the carbon in the biomass is converted to diesel and there is no process $CO_2$ emission. A net input of 24% moisture content of biomass is sufficient to provide water for splitting into $H_2$ and $O_2$ via energy from external sources (not biomass). Because the $H_2$ is incorporated into the diesel fuel (58% net emission), there will be a net emission of $O_2$ at 65% (by weight). All of the emission quantities obviously have a linear relationship, from 50% to 147% of the biomass energy.

Figure 8:
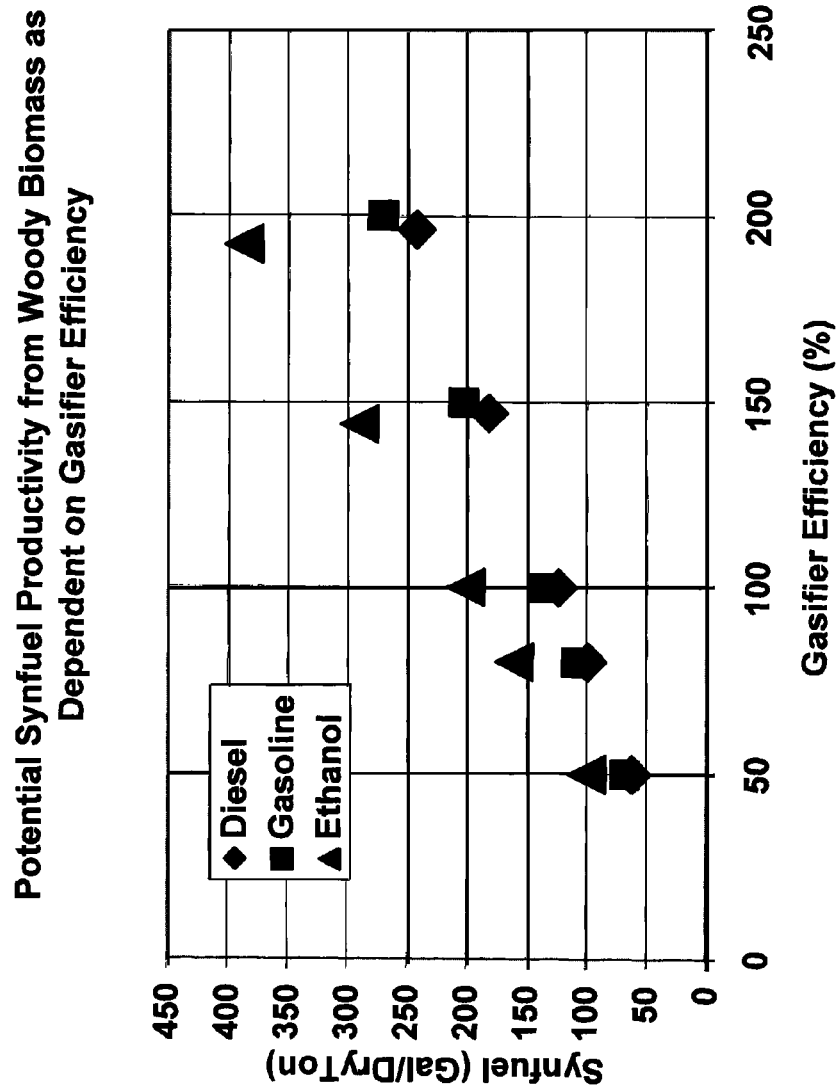
FIG. 8 is a graph depicting potential synfuel productivity from woody biomass, as a function of gasifier efficiency.

The corresponding idealized fuel production (as gallons per dry ton of woody biomass) versus the percentage of biomass energy are plotted in FIG. 8. From this plot, the shipping and storage costs for diesel and gasoline obviously would be much lower, in comparison to ethanol, for the same amount of fuel energy value.

When the biomass-based biofuel industry expands in the future and the demand for biomass increases, the cost of biomass feedstocks will inevitably escalate (as a matter of supply and demand). A realistic long-run value for delivered biomass feedstock in the inventors' view is $75 per dry ton, 2008 dollars (by extrapolating from the data of Walsh,[18] for a reasonable crop yield of hybrid poplar for various regions and adding in costs for transportation and an inflation factor). Lower feedstock values (at approximately $45 per dry ton) may be obtained initially when the biofuel industry is in its infancy; however, when the industry ramps up to larger-scale production, the cost of biomass feedstock will inevitably increase. The escalation of biomass feedstock cost is also implicit in the recently published "Billion Ton Biomass" report, which projected that ~1.36 billion dry tons of biomass could be available in the long run in the United States for use in biofuels, but it would require the cultivation and development of dedicated biomass energy crops, such as short-rotation hybrid poplars, willows, and switchgrass.

See Perlack, Wright, Turhollow, Graham, Stokes, and Erbach, "Biomass as Feedstock for a Bioenergy and Bioproducts Industry: The Technical Feasibility of a Billion-Ton Annual Supply," April, 2005, an official publication jointly published by the United States Department of Energy and Department of Agriculture, on-line at http://feedstockreview.ornl.gov/pdf/billion_ton_vision.pdf (last accessed April 2008), and in hard copy from the National Technical Information Service. Thus, it is assumed that a sustainable long-run cost for such feedstock crops will be approximately $75 per dry ton delivered.

Figure 9:
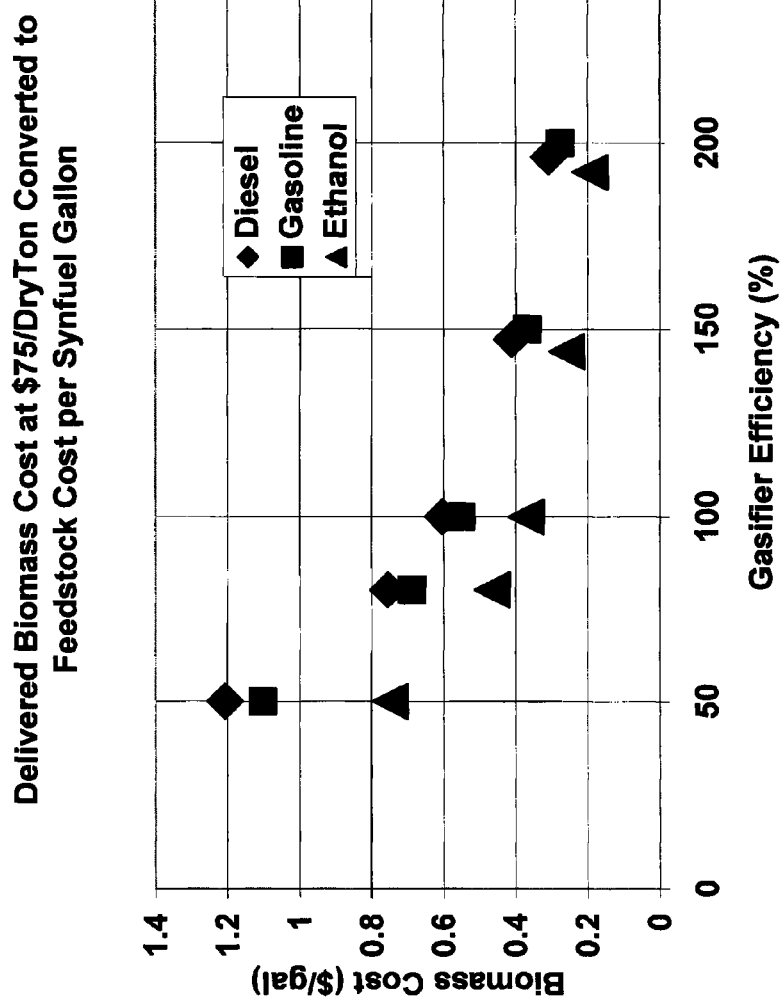
FIG. 9 is a graph depicting delivered biomass cost at $75 per dry ton, converted to feedstock cost per gallon of synfuel.

Therefore, using data from FIG. 8 and the $75/ton biomass cost assumption, the biomass supply cost per gallon of synfuel can be calculated at different levels of biomass energy percentage. The results of these calculations are shown in FIG. 9. For diesel, the cost of biomass supply ranges from $1.21/gal at the current 50% biomass energy level to $0.60/gal at the 100% biomass energy level, and to just $0.41/gal at the 147% biomass energy level. Compare this to the anticipated coal-to-liquid fuel cost of $1/gal diesel at the plant gate. Although ethanol has a much lower cost, in regard to cost of biomass supply per gallon, the lower energy value and higher shipping cost of ethanol cancel that advantage.

Figure 10:
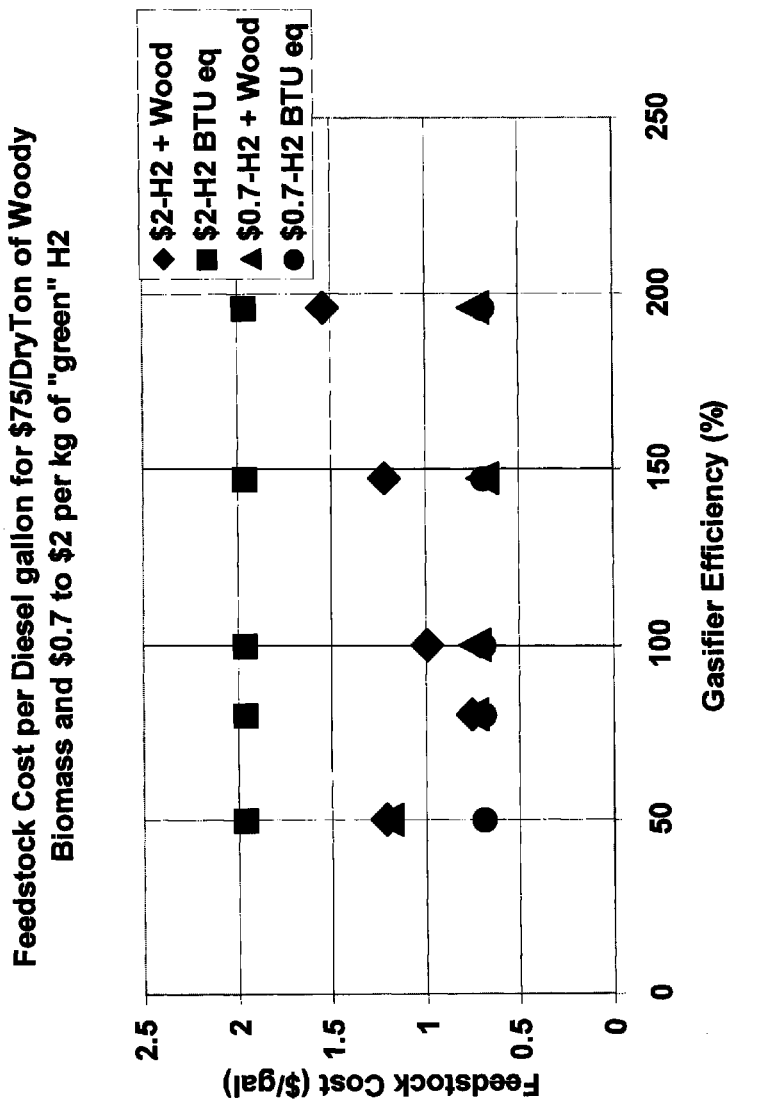
FIG. 10 is a graph depicting feedstock cost per diesel gallon for $75 per dry ton of woody biomass and $0.70/kg to $2/kg of "green" $H_2$.

For a more complete economic assessment of feedstock (input) costs, FIG. 10 shows the combined total cost of $H_2$ and biomass feedstock involved in producing diesel at different levels of biomass energy percentage. It is wasteful to isolate $H_2$ from biomass or synfuel to use as a hydrogen feedstock because it is more efficient to convert most or all carbon in the biomass into synfuel using external sources of hydrogen. A short-term goal for the hydrogen industry (articulated by the U.S. Department of Energy) is to obtain $2/kg of "green" $H_2$ at the plant gate, and then add a dollar more per kilogram to ship the $H_2$. This converts, in terms of equivalent lower heating value (LHV) at the plant gate, to $2/gal of diesel fuel, as shown by the square points in FIG. 10. The levels at 50% and 80% of biomass energy do not need $H_2$ as input, but they will have biomass feedstock costs that are much less than what the $H_2$ near-term technology can provide. The U.S. Department of Energy (DOE) website indicates the possibility of $1/kg of $H_2$ at the plant using windmill power for the electrolysis of water when co-producing power for the electricity grid.

As shown in FIG. 10, the total feedstock cost is $1.21 per gallon, regardless of whether the energy content of the feedstock is at 50% biomass energy or at 150% biomass energy, using the $2/kg $H_2$. However, the three-fold increase in synfuel productivity reduces capital costs and provides greater potential for profit. This scenario would occur while paying biomass providers $75 per dry ton of woody biomass delivered, which should be enough to encourage producers to practice resource sustainability and permit government to conserve prime woody biomass for ecological development of habitat, watershed, and biodiversity. Because it is expected that the future cost to produce $H_2$ will fall below $1/kg, the combined feedstock costs of biomass and hydrogen, on the basis of the cost-per-gallon of diesel, will leave plenty of room for capital and operational costs to reach a targeted $1/gal of diesel to compete with coal-to-liquid fuels or petroleum sources of motor transportation fuels.

Therefore, in anticipation of the coming hydrogen economy, a gasifier is needed that can function at up to a level of 150%, and utilize hydrogen gas to aids in the total conversion of biomass carbon to synfuel. The present invention is such a device. This is a tremendous advantage as compared to some existing gasifiers, which must undergo expensive replacement or upgrading to remain current with the advances in the $H_2$ production and biomass carbon conversions.

Potential for Replacing Fossil Fuels with Biofuels in U.S. Transportation:

A question of overarching concern is whether the United States has sufficient biomass to replace fossil fuels in transportation. It has been estimated recently that the volume of biomass that we can modestly obtain without affecting any other crop or forest usage, as described in the "Billion Ton Report", supra, is 1.36 billion dry tons per year for the United States. This level of biomass production is likely to be economically obtainable only if prevailing biomass prices reach $75 per dry ton of biomass delivered to plant.

Figure 11:
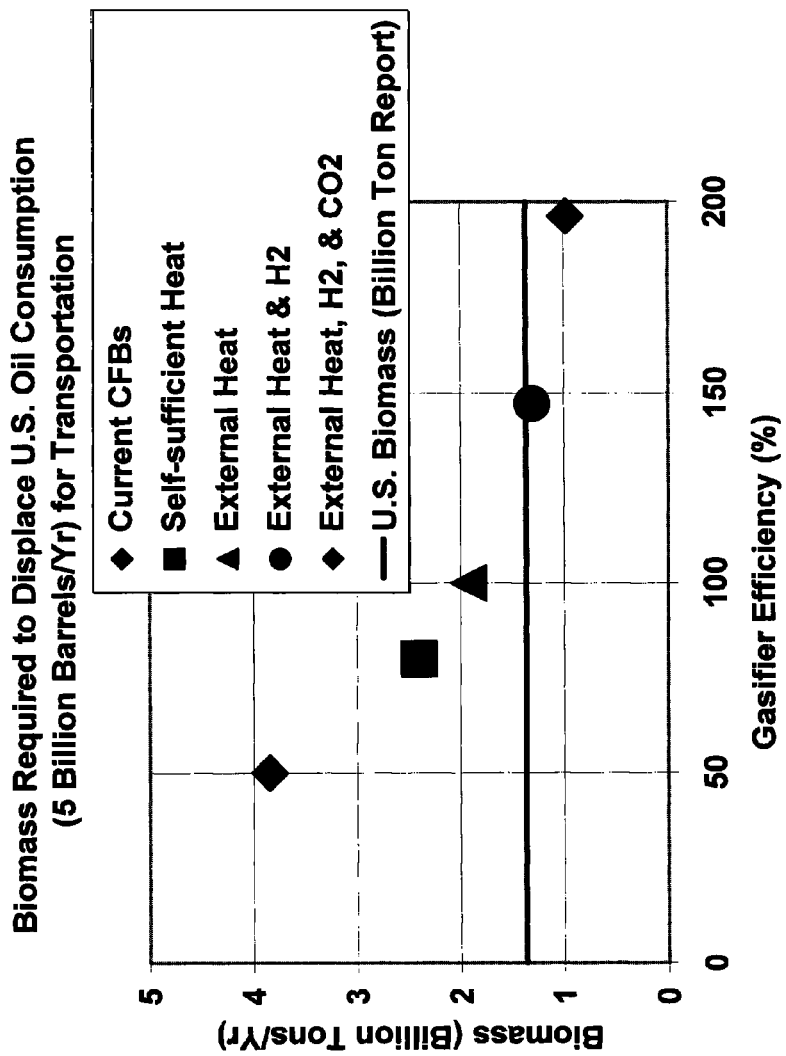
FIG. 11 is a graph depicting biomass required to displace U.S. oil consumption (5 billion barrels/yr) for transportation.

At the conventional 50% biomass energy level, as shown in FIG. 11, this 1.36 billion tons of biomass is only one-third of that needed to displace the 5 billion barrels of petroleum consumed per year for transportation fuels in the United States. U.S. Dept. of Energy Annual Energy Review 2006, Report No. DOE/EIA-0384 (2006). However, at the 147% biomass energy level, which relies on the use of "green" $H_2$ and the conversion of all feedstock carbon to synfuel, all of the current liquid fuel transportation needs of the United States could be met via biofuels produced from 1.36 billion tons of biomass. Coupled with a significant improvement in gas mileage, the U.S. could become an energy-exporting nation.

What is claimed is:

1. An apparatus for converting biomass into synthesis gas, the apparatus comprising:
   a first molten liquid bath dimensioned and configured to maintain a molten liquid at a first temperature suitable for drying a biomass reactant without degrading the biomass reactant, to yield dried biomass and process gas comprising water, wherein the first bath is dimensioned and configured to transfer molten liquid and dried biomass contained therein to
   a second molten liquid bath dimensioned and configured to maintain a molten liquid at a second temperature suitable for fast pyrolyzing the dried biomass to yield gas, tar, and char, wherein the second bath is dimensioned and configured to transfer molten liquid, and the gas, tar, and char contained therein to
   a third molten liquid bath dimensioned and configured to maintain a molten liquid at a third temperature suitable for reforming gas, tar, and char into synthesis gas, wherein the third bath is dimensioned and configured to transfer molten liquid, tar, and char contained therein to
   a separator dimensioned and configured to separate tar and char from the molten liquid to yield clean molten liquid, wherein the separator is also operationally connected to the first molten liquid bath and dimensioned and configured to transfer clean molten liquid from the separator to the first molten liquid bath;
   a conduit operationally connecting the first molten liquid bath to the second molten liquid bath and a process gas reservoir, wherein the conduit is dimensioned and configured to transfer moisture from the first molten liquid bath to the second molten liquid bath and the process gas reservoir; and
   a conduit operationally connecting the process gas reservoir to the third molten liquid bath, wherein the conduit is dimensioned and configured to transfer moisture from the process gas reservoir to the third molten liquid bath.

2. An apparatus for converting biomass into synthesis gas, the apparatus comprising:
   a first molten liquid bath dimensioned and configured to maintain a molten liquid at a first temperature suitable for drying a biomass reactant without degrading the biomass reactant, to yield process gas and dried biomass;
   a second molten liquid bath dimensioned and configured to maintain a molten liquid at a second temperature suitable for fast pyrolyzing the dried biomass to yield gas, tar, and char;
   a third molten liquid bath dimensioned and configured to maintain a molten liquid at a third temperature suitable for reforming gas, tar, and char into synthesis gas;
   a char crusher interposed between the second molten liquid bath and the third molten liquid bath, the char crusher dimensioned and configured to crush char into powdered char;
   a conveyer assembly dimensioned and configured to: (a) move the dried biomass from the first molten liquid bath to the second molten liquid bath; (b) to move char from the second molten liquid bath to the char crusher; and (c) to move powdered char from the char crusher to the third molten liquid bath;
   a conduit operationally connecting the first molten liquid bath to the second molten liquid bath and a process gas reservoir, wherein the conduit is dimensioned and configured to transfer moisture from the first molten liquid bath to the second molten liquid bath and the process gas reservoir; and
   a conduit operationally connecting the process gas reservoir to the third molten liquid bath, wherein the conduit is dimensioned and configured to transfer moisture from the process gas reservoir to the third molten liquid bath.

* * * * *